(12) United States Patent
Chen et al.

(10) Patent No.: US 11,936,890 B2
(45) Date of Patent: Mar. 19, 2024

(54) VIDEO CODING USING INTRA SUB-PARTITION CODING MODE

(71) Applicant: BEIJING DAJIA INTERNET INFORMATION TECHNOLOGY CO., LTD., Beijing (CN)

(72) Inventors: Yi-Wen Chen, San Diego, CA (US); Xiaoyu Xiu, San Diego, CA (US); Xianglin Wang, San Diego, CA (US); Tsung-Chuan Ma, San Diego, CA (US)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 289 days.

(21) Appl. No.: 17/393,364

(22) Filed: Aug. 3, 2021

(65) Prior Publication Data
US 2021/0368193 A1     Nov. 25, 2021

Related U.S. Application Data

(63) Continuation of application No. PCT/US2020/016888, filed on Feb. 5, 2020.
(Continued)

(51) Int. Cl.
*H04N 19/44*     (2014.01)
*H04N 19/105*    (2014.01)
(Continued)

(52) U.S. Cl.
CPC .......... *H04N 19/44* (2014.11); *H04N 19/105* (2014.11); *H04N 19/119* (2014.11);
(Continued)

(58) Field of Classification Search
None
See application file for complete search history.

(56) References Cited

U.S. PATENT DOCUMENTS 8,976,870 B1    3/2015  Cismas
9,749,622 B2    8/2017  Merkle et al.
(Continued)

FOREIGN PATENT DOCUMENTS

CN      107113444 A       8/2017
KR    10-20150064163 A    6/2015
(Continued)

OTHER PUBLICATIONS

International Search Report and Written Opinion of PCT Application No. PCT/CN2020/016888 dated May 28, 2020, (11p).
(Continued)

*Primary Examiner* — Talha M Nawaz
(74) *Attorney, Agent, or Firm* — Arch & Lake LLP

(57) ABSTRACT

A method of video coding comprises independently generating a respective intra prediction for each of a plurality of corresponding sub-partitions. Each respective intra prediction is generated using a plurality of reference samples from a current coding block. Illustratively, no reconstructed sample from a first sub-partition of the plurality of corresponding sub-partitions is used to generate a respective intra prediction for any other sub-partition of the plurality of corresponding sub-partitions, and each of the plurality of corresponding sub-partitions has a width less than or equal to 2.

16 Claims, 14 Drawing Sheets

Related U.S. Application Data

(60) Provisional application No. 62/801,214, filed on Feb. 5, 2019.

(51) Int. Cl.

| | |
|---|---|
| *H04N 19/119* | (2014.01) |
| *H04N 19/132* | (2014.01) |
| *H04N 19/159* | (2014.01) |
| *H04N 19/176* | (2014.01) |
| *H04N 19/186* | (2014.01) |
| *H04N 19/46* | (2014.01) |
| *H04N 19/593* | (2014.01) |

(52) U.S. Cl.
CPC ......... *H04N 19/132* (2014.11); *H04N 19/159* (2014.11); *H04N 19/176* (2014.11); *H04N 19/186* (2014.11); *H04N 19/46* (2014.11); *H04N 19/593* (2014.11)

(56) References Cited

U.S. PATENT DOCUMENTS

| | | | | |
|---|---|---|---|---|
| 11,683,486 | B2* | 6/2023 | Kang | H04N 19/11 375/240.02 |
| 2014/0092963 | A1 | 4/2014 | Wang | |
| 2016/0014416 | A1 | 1/2016 | Hinz et al. | |
| 2017/0230671 | A1 | 8/2017 | Kim et al. | |
| 2017/0339403 | A1 | 11/2017 | Min et al. | |
| 2019/0387226 | A1 | 12/2019 | Lee | |
| 2020/0077089 | A1 | 3/2020 | Lee | |
| 2020/0252608 | A1* | 8/2020 | Ramasubramonian | H04N 19/119 |
| 2020/0366895 | A1* | 11/2020 | De Luxán Hernández | H04N 19/593 |
| 2021/0136373 | A1* | 5/2021 | De Luxán Hernández | H04N 19/61 |
| 2021/0195199 | A1 | 6/2021 | Choi et al. | |
| 2021/0227208 | A1* | 7/2021 | Lee | H04N 19/593 |
| 2021/0306666 | A1* | 9/2021 | Lee | H04N 19/105 |
| 2021/0360240 | A1* | 11/2021 | Lee | H04N 19/159 |
| 2021/0368205 | A1* | 11/2021 | Chen | H04N 19/159 |

FOREIGN PATENT DOCUMENTS

| | | |
|---|---|---|
| KR | 201800065953 A | 6/2018 |
| KR | 1020180059367 | 6/2018 |
| WO | 2017142327 A1 | 8/2017 |

OTHER PUBLICATIONS

Santiago De-Luxan-Hernandez et al., CE3: Intra Sub-Partitions Coding Mode (Tests 1.1.1 and 1.1.2), Joint Video Experts Team (JVET) of ITU-T SG 16 WP 3 and ISO/IEC JTC 1/SC 29/WG 11, JVET-M0102-v5, 13th Meeting : Marrakech, MA, Jan. 18, 2019, (9p).
Jeeyoon Park et al., CE3-related: Modified Chroma Intra Mode Coding, Joint Video Experts Team (JVET) of ITU-T SG 16 WP 3 and ISO/IEC JTC 1/SC 29/WG 11, JVET-M0324, 13th Meeting : Marrakech, MA, pp. 1-6, Jan. 18, 2019, (6p).
Yu-Chen Sun et al., CE8-related: Context modeling on palette mode flag, Joint Video Experts Team (JVET) of ITU-T SG 16 WP 3 and ISO/IEC JTC 1/SC 29/WG 11, JVET-M0419, 13th Meeting : Marrakech, MA, pp. 1-3, Jan. 18, 2019 (3p).
Po-Han Lin et al., CEIO-related : Simplification of intra prediction in CI IP, Joint Video Experts Team (JVET) of ITU-T SG 16 WP 3 and ISO/IEC JTC 1/SC 29/WG 11, JVET-M0525-v2, 13th Meeting : Marrakech, MA, pp. 1-3, Jan. 18, 2019, (3p).
Second Office Action and search report dated Nov. 3, 2022 for counterpart Chinese patent application No. 202111101969.4, along with machine English translation, (12p).
Third Office Action and search report dated Feb. 25, 2023 for counterpart Chinese patent application No. 202111101969.4, along with machine English translation, (7p).
Decision of Refusal by the Japan Patent Office issued for corresponding Japanese Patent Application No. 2021-545471 dated Jan. 10, 2023 along with machine English translation,(2p).
Second Office Action issued of Japanese Patent Application No. 2021-545471 dated Jul. 12, 2022 with English translation,(7p).
First Office Action issued of Chinese Patent Application No. 202111101969.4 dated Jul. 18, 2022 with English translation,(10p).
Search Report issued in Chinese Patent Application No. 202111101969.4 dated Jul. 18, 2022 with English translation,(5p).
Extended European Search Report issued in Application No. 20753053.6 dated Jul. 22, 2022,(6p).
Santiago De Luxan Hernandez (Fraunhofer HHI) et al. "CE3: Line-based intra coding mode (Tests 2.1.1 and 2.1.2)", Joint Video Experts Team(JVET) of ITU-T SG 16 WP 3 and ISO/IEC JTC 1/SC 29/WG11, JVET-L0076-v2, 12th Meeting, Macao, CN, Oct. 3-12, 2018, (9p).
Jianle Chen et al. "Algorithm description for Versatile Video Coding and Test Model 4 (VTM 4)", Joint Video Experts Team(JVET) of ITU-T SG 16 WP 3 and ISO/IEC JTC 1/SC 29/WG11, JVET-M1002-v2, 13th Meeting, Marrakech, MA, Jan. 9-18, 2019,(62p).
Adarsh K. Ramasubramonian (Qualcomm Inc.) et al. "AHG16/Non-CE3: On 1xN and 2xN subpartitions in intra subpartition coding", Joint Video Experts Team(JVET) of ITU-T SG 16 WP 3 and ISO/IEC JTC 1/SC 29/WG11, JVET-N0432, 14th Meeting, Geneva, CH, Mar. 19-27, 2019,(4p).
Santiago De Luxan Hernandez (Fraunhofer HHI) et al. "Non-CE3: ISP with independent sub-partitions for certain block sizes",Joint Video Experts Team(JVET) of ITU-T SG 16 WP 3 and ISO/IEC JTC 1/SC 29/WG11, JVET-N0372-v1, 14th Meeting, Geneva, CH, Mar. 19-27, 2019,(8p).
First Office Action issued of European Patent Application No. 20753053.6 dated Aug. 3, 2022,(7p).
Decision of Rejection issued of Korean patent application No. 10-2021-7024197 dated Aug. 16, 2022, with the English translation,(5p).
Decision on Dismissal of Amendent issued of Korean patent application No. 10-2021-7024197 dated Aug. 16, 2022, with the English translation,(4p).
First Office Action issued in Korean Patent Application No. 10-2021-7024197 dated Dec. 6, 2021 with the English translation, (17p).
Andrew Segall et al., "Parallel intra prediction for video coding", 28th Picture Coding Symposium, PCS2010, Dec. 10, 2010, (4p).
First Office Action issued for corresponding Japanese Patent Application 2021-545471 dated Feb. 8, 2022, (6 pages).
Zhi-Yi Lin et al., "CE3-related: Shared reference samples for multiple chroma intra CBs", Joint Video Experts Team (JVET), Jan. 16, 2019, (5 pages).
Santiago De-Luxan-Hernandez et al., "CE3: Intra Sub-Partitions Coding Mode (Tests 1.1.1 and 1.1.2)", Joint Video Experts Team (JVET), Jan. 17, 2019, (12 pages).
Second Office Action of Korean Patent Application No. 10-2021-7024197 dated Apr. 22, 2022 with English translation, (9p).
Examination Report issued to Indian Application No. 202147033756 dated May 25, 2022 with partial English translation, (7p).
Decision of Rejection dated Jun. 16, 2023 for counterpart Chinese Patent Application No. 202111101969.4, along with English translation, (14p).
MediaTek Inc., Zhi-Yi Lin, et al., "CE3 related: Shared reference samples for multiple chroma intra CBs", Joint Video Experts Team (JVET) of ITU-T SG 16 WP 3 and ISO/IEC JTC 1/SC 29/WG 11 13th Meeting: Marrakech, MA, Jan. 9-18, 2019, Document: JVET-M0169-v1, (4p).
Fraunhofer HHI, Santiago De-Luxán-Hernández, et al., "CE3: Intra Sub-Partitions Coding Mode (Tests 1.1.1 and 1.1.2)", Joint Video Experts Team (JVET) of ITU-T SG 16 WP 3 and ISO/IEC JTC 1/SC 29/WG 11 13th Meeting: Marrakech, MA, Jan. 9-18, 2019. Document: JVET-M0102-v5, (9p).

* cited by examiner ns 1 and 2 of US 11,936,890 B2 follow.

VIDEO CODING USING INTRA SUB-PARTITION CODING MODE

CROSS-REFERENCE TO RELATED APPLICATION

This application is a continuation of PCT Application PCT/US2020/016888 filed on Feb. 5, 2020, which is based upon and claims the benefit of U.S. provisional patent application Ser. No. 62/801,214 filed on Feb. 5, 2019, the entire disclosures of which are incorporated herein by reference in their entireties for all purposes.

FIELD

The present disclosure relates generally to video coding and compression. More specifically, this disclosure relates to systems and methods for performing video coding using intra sub-partition coding mode.

BACKGROUND

This section provides background information related to the present disclosure. The information contained within this section should not necessarily be construed as prior art.

Any of various video coding techniques may be used to compress video data. Video coding can be performed according to one or more video coding standards. Some illustrative video coding standards include versatile video coding (VVC), joint exploration test model (JEM) coding, high-efficiency video coding (H.265/HEVC), advanced video coding (H.264/AVC), and moving picture experts group (MPEG) coding.

Video coding generally utilizes predictive methods (e.g., inter-prediction, intra-prediction, or the like) that take advantage of redundancy inherent in video images or sequences. One goal of video coding techniques is to compress video data into a form that uses a lower bit rate, while avoiding or minimizing degradations to video quality.

The first version of the HEVC standard, finalized in October of 2013, offers an approximately 50% bit-rate saving or equivalent perceptual quality, compared to the prior-generation video coding standard (H.264/MPEG AVC). Although the HEVC standard provides significant coding improvements compared to its predecessor, there is evidence that superior coding efficiency can be achieved over HEVC by using additional coding tools. Based on this evidence, both the Video Coding Experts Group (VCEG) and the Moving Picture Experts Group (MPEG) commenced exploratory work to develop new coding technologies for future video coding standardization. The Joint Video Exploration Team (JVET) was formed in October of 2015 by ITU-T VECG and ISO/IEC MPEG to begin significant study of advanced technologies that could enable substantial enhancement of coding efficiency. One reference software model, called the Joint Exploration Model (JEM), was maintained by the VET by integrating several additional coding tools on top of the HEVC test model (HM).

In October of 2017, the joint call for proposals (CfP) on video compression with capability beyond HEVC was issued by ITU-T and ISO/IEC. In April of 2018, 23 CfP responses were received and evaluated at the 10th VET meeting. These responses demonstrated compression efficiency gain over the HEVC standard of approximately 40%. Based on such evaluation results, the VET launched a new project to develop the next-generation video coding standard called Versatile Video Coding (VVC). Also during April of 2018, one reference software codebase, called the VVC test model (VTM), was established for demonstrating a reference implementation of the VVC standard.

SUMMARY

This section provides a general summary of the disclosure, and is not a comprehensive disclosure of its full scope or all of its features.

According to a first aspect of the present disclosure, a video coding method is performed at a computing device having one or more processors and memory storing a plurality of programs to be executed by the one or more processors. The method includes independently generating a respective intra prediction for each of a plurality of corresponding sub-partitions, wherein each respective intra prediction is generated using a plurality of reference samples from a current coding block.

According to a second aspect of the present disclosure, a video coding method is performed at a computing device having one or more processors and memory storing a plurality of programs to be executed by the one or more processors. The method includes generating a respective intra prediction for each of a plurality of corresponding sub-partitions using only N modes out of M possible intra prediction modes for a luma component of an intra sub partition (ISP) coded block, wherein M and N are positive integers and N is less than M.

According to a third aspect of the present disclosure, a video coding method is performed at a computing device having one or more processors and memory storing a plurality of programs to be executed by the one or more processors. The method includes generating an intra prediction using only N modes out of M possible intra prediction modes for a chroma component of an intra sub partition (ISP) coded block, wherein M and N are positive integers and N is less than M.

According to a fourth aspect of the present disclosure, a video coding method is performed at a computing device having one or more processors and memory storing a plurality of programs to be executed by the one or more processors. The method includes generating a respective luma intra prediction for each of a plurality of corresponding sub-partitions of an entire intra sub partition (ISP) coded block for a luma component, and for a chroma component, generating a chroma intra prediction for the entire intra sub partition (ISP) coded block.

According to a fifth aspect of the present disclosure, a video coding method is performed at a computing device having one or more processors and memory storing a plurality of programs to be executed by the one or more processors. The method includes generating a first prediction using an intra sub partition mode; generating a second prediction using an inter prediction mode; and combining the first and second predictions to generate a final prediction by applying a weighted averaging to the first prediction and the second prediction.

BRIEF DESCRIPTION OF THE DRAWINGS

Hereinafter, sets of illustrative, non-limiting embodiments of the present disclosure will be described in conjunction with the accompanying drawings. Variations of structure, method, or functionality may be implemented by those of ordinary skill in the relevant art based on the examples presented herein, and such variations are all contained within the scope of the present disclosure. In cases where no conflict is present, the teachings of different embodiments may, but need not, be combined with one another.

DETAILED DESCRIPTION

The terms used in the present disclosure are directed to illustrating particular examples, rather than to limit the present disclosure. The singular forms "a" "an" and "the" as used in the present disclosure as well as the appended claims also refer to plural forms unless other meanings are definitely contained in the context. It should be appreciated that the term "and/or" as used herein refers to any or all possible combinations of one or more associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to," depending on the context.

Reference throughout this specification to "one embodiment," "an embodiment," "another embodiment," or the like in the singular or plural means that one or more particular features, structures, or characteristics described in connection with an embodiment are included in at least one embodiment of the present disclosure. Thus, the appearances of the phrases "in one embodiment" or "in an embodiment," "in another embodiment," or the like in the singular or plural in various places throughout this specification are not necessarily all referring to the same embodiment. Furthermore, the particular features, structures, or characteristics in one or more embodiments may be combined in any suitable manner.

Conceptually, many video coding standards are similar, including those previously mentioned in the Background section. For example, virtually all video coding standards use block-based processing, and share similar video coding block diagrams to achieve video compression. Like HEVC, the VVC standard is built upon the block-based hybrid video coding framework.

Figure 1:
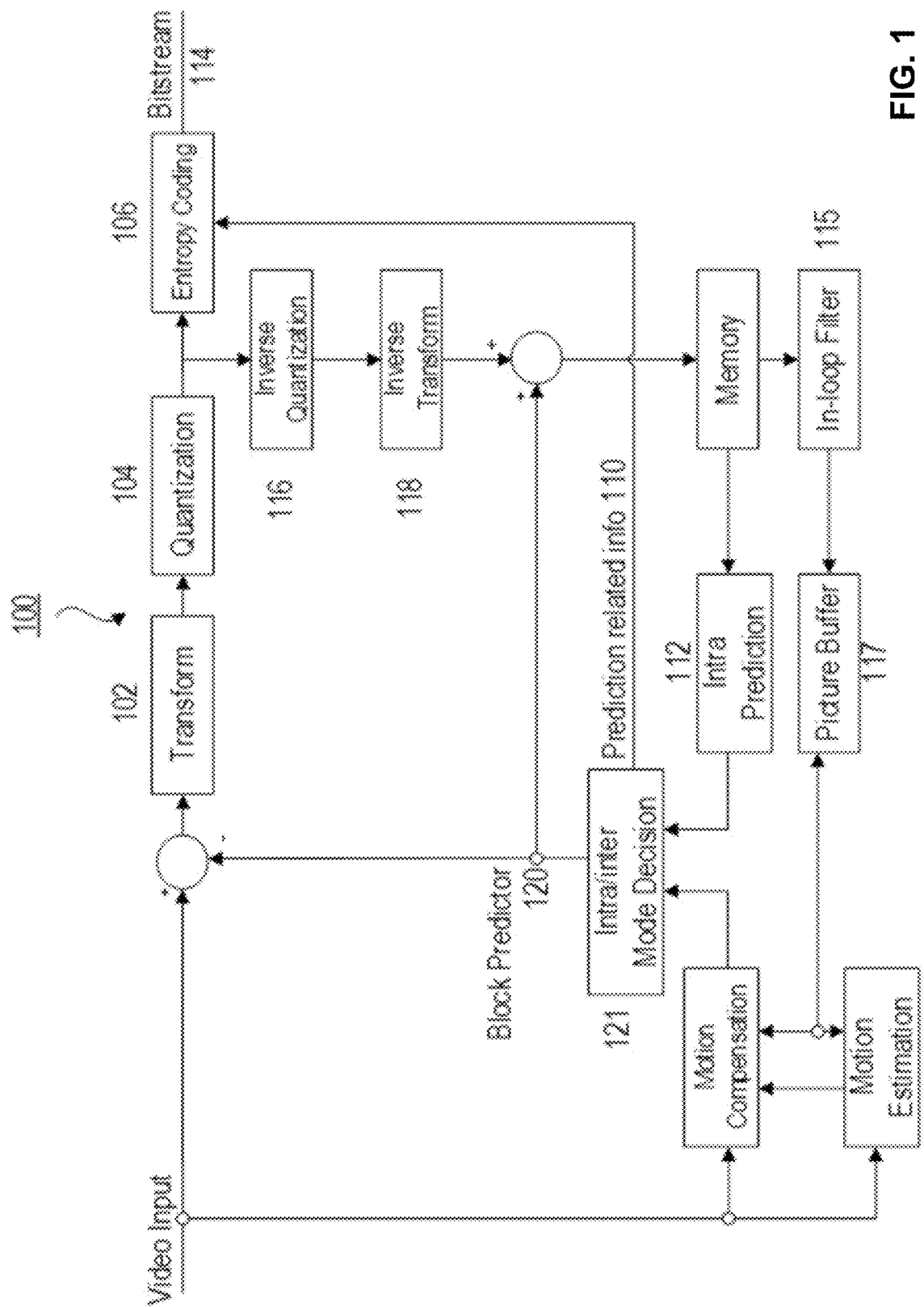
FIG. 1 is a block diagram setting forth an illustrative encoder which may be used in conjunction with many video coding standards.

FIG. 1 shows a block diagram of an illustrative encoder 100 which may be used in conjunction with many video coding standards. In the encoder 100, a video frame is partitioned into a plurality of video blocks for processing. For each given video block, a prediction is formed based on either an inter prediction approach or an intra prediction approach. In inter prediction, one or more predictors are formed through motion estimation and motion compensation, based on pixels from previously reconstructed frames. In intra prediction, predictors are formed based on reconstructed pixels in a current frame. Through mode decision, a best predictor may be chosen to predict a current block.

A prediction residual, representing the difference between a current video block and its predictor, is sent to a Transform 102 circuitry. Transform coefficients are then sent from the Transform 102 circuitry to a Quantization 104 circuitry for entropy reduction. Quantized coefficients are then fed to an Entropy Coding 106 circuitry to generate a compressed video bitstream. As shown in FIG. 1, prediction-related information 110 from an inter prediction circuitry and/or an Intra Prediction 112 circuitry, such as video block partition info, motion vectors, reference picture index, and intra prediction mode, are also fed through the Entropy Coding 106 circuitry and saved into a compressed video bitstream 114.

In the encoder 100, decoder-related circuitries are also needed in order to reconstruct pixels for the purpose of prediction. First, a prediction residual is reconstructed through an Inverse Quantization 116 circuitry and an Inverse Transform 118 circuitry. This reconstructed prediction residual is combined with a Block Predictor 120 to generate un-filtered reconstructed pixels for a current video block.

To improve coding efficiency and visual quality, an In-Loop Filter 115 is commonly used. For example, a deblocking filter is available in AVC, HEVC, as well as the current version of VVC. In HEVC, an additional in-loop filter called SAO (sample adaptive offset) is defined to further improve coding efficiency. In the now-current version of the VVC standard, yet another in-loop filter called ALF (adaptive loop filter) is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

Figure 2:
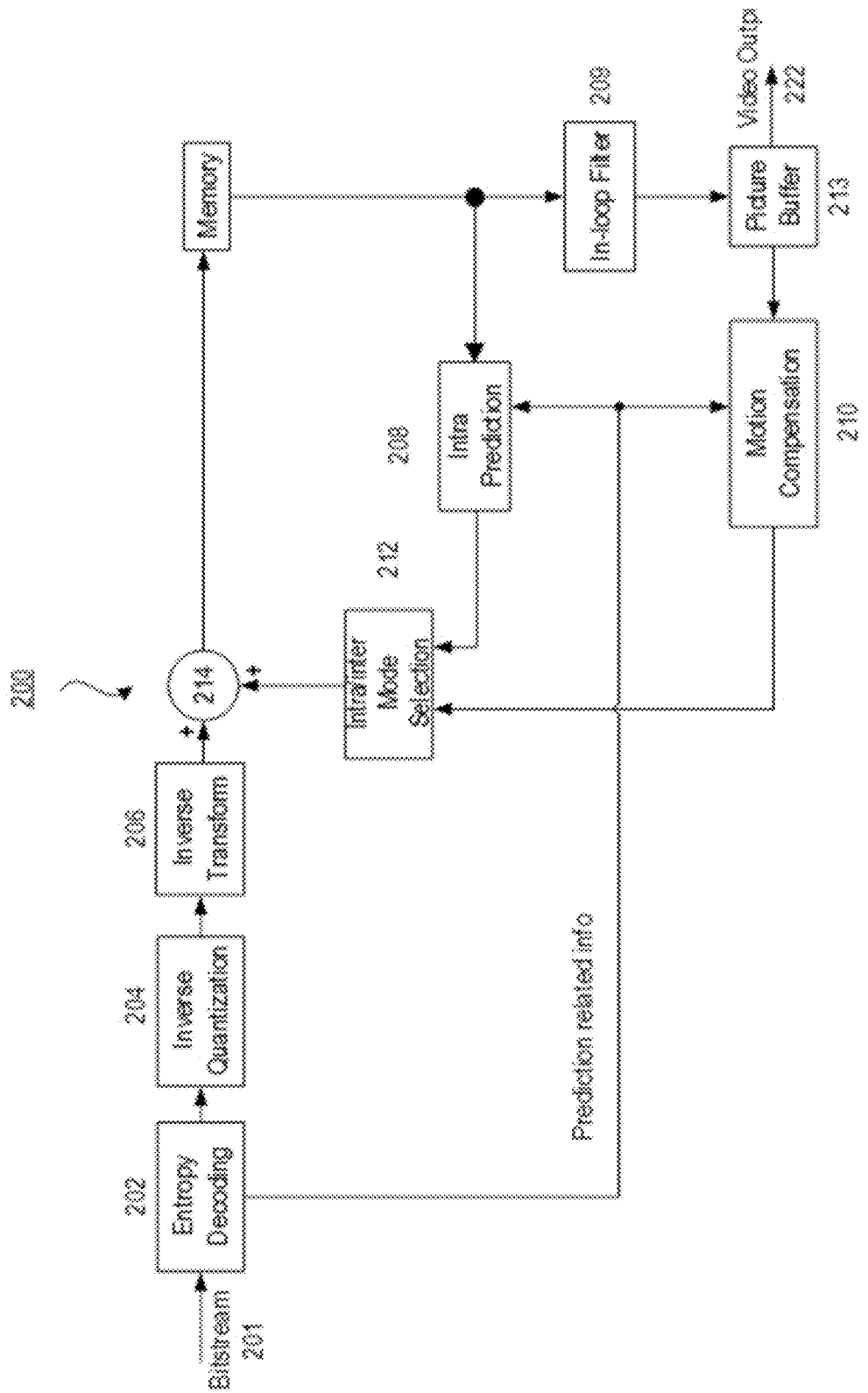
FIG. 2 is a block diagram setting forth an illustrative decoder which may be used in conjunction with many video coding standards.

FIG. 2 is a block diagram setting forth an illustrative decoder 200 which may be used in conjunction with many video coding standards. This decoder 200 is similar to the reconstruction-related section residing in the encoder 100 of FIG. 1. In the decoder 200 (FIG. 2), an incoming video bitstream 201 is first decoded through an Entropy Decoding 202 circuitry to derive quantized coefficient levels and prediction-related information. The quantized coefficient levels are processed through an Inverse Quantization 204 circuitry and an Inverse Transform 206 circuitry to obtain a reconstructed prediction residual. A block predictor mechanism, implemented in an Intra/inter Mode Selector 212, is configured to perform either an Intra Prediction 208 procedure, or a Motion Compensation 210 procedure, based on decoded prediction information. A set of unfiltered reconstructed pixels are obtained by summing up the reconstructed prediction residual from the Inverse Transform 206 circuitry and a predictive output generated by the block predictor mechanism, using a Summer 214. The reconstructed block may further go through an In-Loop Filter 209 before it is stored in a Picture Buffer 213 which functions as a reference picture store. The reconstructed video in the Picture Buffer 213 can then be sent out to drive a display device, as well as used to predict future video blocks. In situations where the In-Loop Filter 209 is turned on, a filtering operation is performed on these reconstructed pixels to derive a final reconstructed Video Output 222.

Returning now to FIG. 1, an input video signal to the encoder 100 is processed block by block. Each block is called a coding unit (CU)). In VTM-1.0, a CU can be up to 128×128 pixels. In High Efficiency Video Encoding (HEVC), Joint Exploration Test Model (JEM), and Versatile Video Encoding (VVC), the basic unit for compression is termed a coding tree unit (CTU). However, in contrast to the HEVC standard which partitions blocks only based on quad-trees, in the VVC standard, one coding tree unit (CTU) is split into CUs to adapt to varying local characteristics based on a quad/binary/ternary-tree structure. Additionally, the concept of multiple partition unit type in the HEVC standard is not present in the VVC standard, i.e., the separation of CU, prediction unit (PU) and transform unit (TU) does not exist in the VVC standard; instead, each CU is always used as the basic unit for both prediction and transform without further partitions. The maximum CTU size for HEVC and JEM is defined as being up to 64 by 64 luma pixels, and two blocks of 32 by 32 chroma pixels, for a 4:2:0 chroma format. The maximum allowed size of the luma block in a CTU is specified to be 128×128 (although the maximum size of the luma transform block is 64×64).

Figure 3:
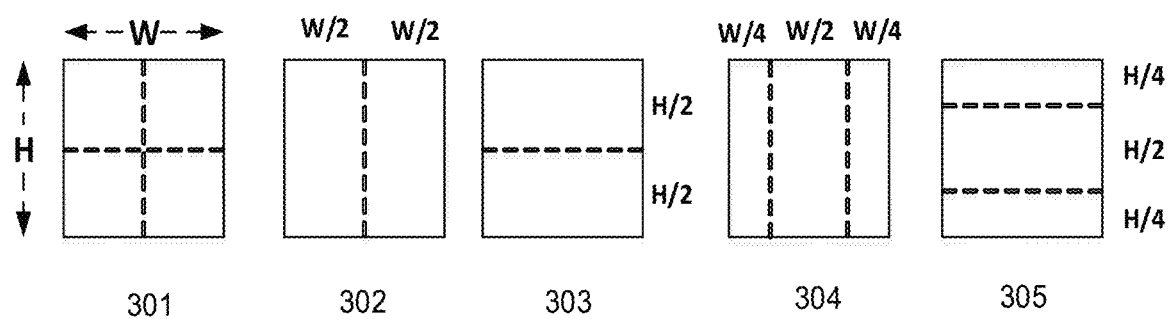
FIG. 3 illustrates five types of exemplary block partitions for a multi-type tree structure.

FIG. 3 illustrates five types of exemplary block partitions for a multi-type tree structure. The five types of exemplary block partitions include quaternary partitioning 301, horizontal binary partitioning 302, vertical binary partitioning 303, horizontal ternary partitioning 304, and vertical ternary partitioning 305. In situations where a multi-type tree structure is utilized, one CTU is first partitioned by a quad-tree structure. Then, each quad-tree leaf node can be further partitioned by a binary and ternary tree structure.

Using one or more of the exemplary block partitionings 301, 302, 303, 304, or 305 of FIG. 3, spatial prediction and/or temporal prediction may be performed using the configuration shown in FIG. 1. Spatial prediction (or "intra prediction") uses pixels from the samples of already-coded neighboring blocks (which are called reference samples) in the same video picture/slice to predict the current video block. Spatial prediction reduces spatial redundancy inherent in the video signal.

Temporal prediction (also referred to as "inter prediction" or "motion compensated prediction") uses reconstructed pixels from already-coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes.

After spatial and/or temporal prediction is performed, an intra/inter mode decision 121 circuitry in the encoder 100 chooses the best prediction mode, for example based on the rate-distortion optimization method. The block predictor 120 is then subtracted from the current video block; and the resulting prediction residual is de-correlated using the transform 102 circuitry and the quantization 104 circuitry. The resulting quantized residual coefficients are inverse quantized by the inverse quantization 116 circuitry and inverse transformed by the inverse transform 118 circuitry 118 to form the reconstructed residual, which is then added back to the prediction block to form the reconstructed signal of the CU. Further in-loop filtering 115, such as a deblocking filter, a sample adaptive offset (SAO), and/or an adaptive in-loop filter (ALF) may be applied on the reconstructed CU before it is put in the reference picture store of the picture buffer 117 and used to code future video blocks. To form the output video bitstream 114, coding mode (inter or intra), prediction mode information, motion information, and quantized residual coefficients are all sent to the entropy coding unit 106 to be further compressed and packed to form the bit-stream.

The basic intra prediction scheme applied in the VVC standard is kept generally the same as that of the HEVC standard, except that several modules are further extended and/or improved in the VVC standard, such as intra subpartition (ISP) coding mode, extended intra prediction with wide-angle intra directions, position-dependent intra prediction combination (PDPC) and 4-tap intra interpolation. One broad aspect of this disclosure is directed to improving the existing ISP design in the VVC standard. Moreover, other coding tools (e.g., the tools in the intra prediction and transform coding processes) that are included in the VVC standard and that are closely related to the proposed techniques in this disclosure are discussed in greater detail hereinafter.

Intra Prediction Modes with Wide-Angle Intra Directions

As in the case of the HEVC standard, the VVC standard uses a set of previously-decoded samples that neighbor one current CU (i.e., above or left) to predict the samples of the CU. However, to capture finer-edge directions that are present in natural video (especially for video content having a high resolution, e.g., 4K), the amount of angular intra modes is extended from 33 modes in the HEVC standard to 93 modes in the VVC standard. In addition to angular directions, both the HEVC standard and the VVC standard provide for a Planar mode (which assumes a gradual changing surface with a horizontal and a vertical slope derived from boundaries), and a DC mode (which assumes a flat surface).

Figure 4:
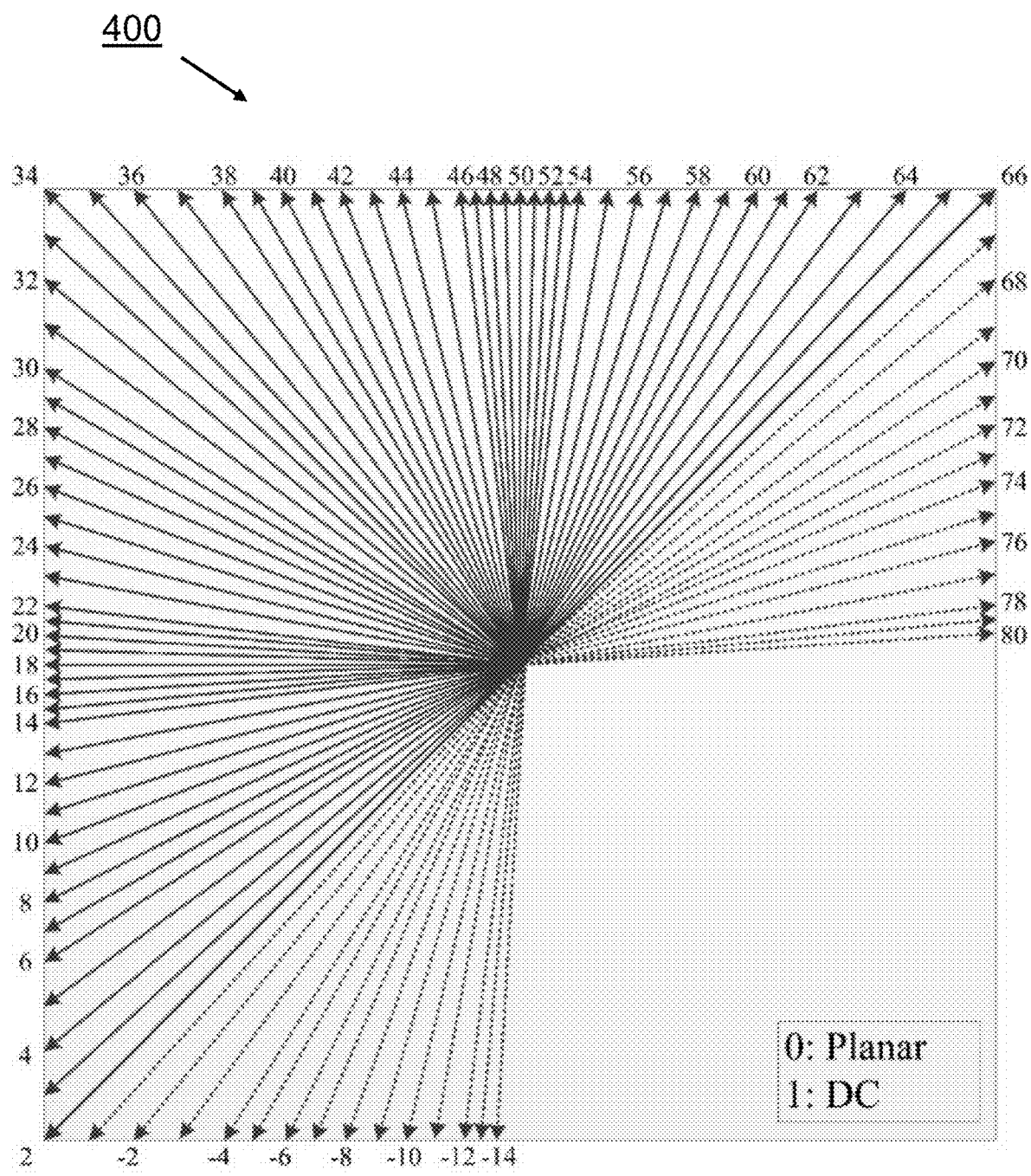
FIG. 4 illustrates a set of exemplary intra modes for use with the VVC standard.
Figure 5:
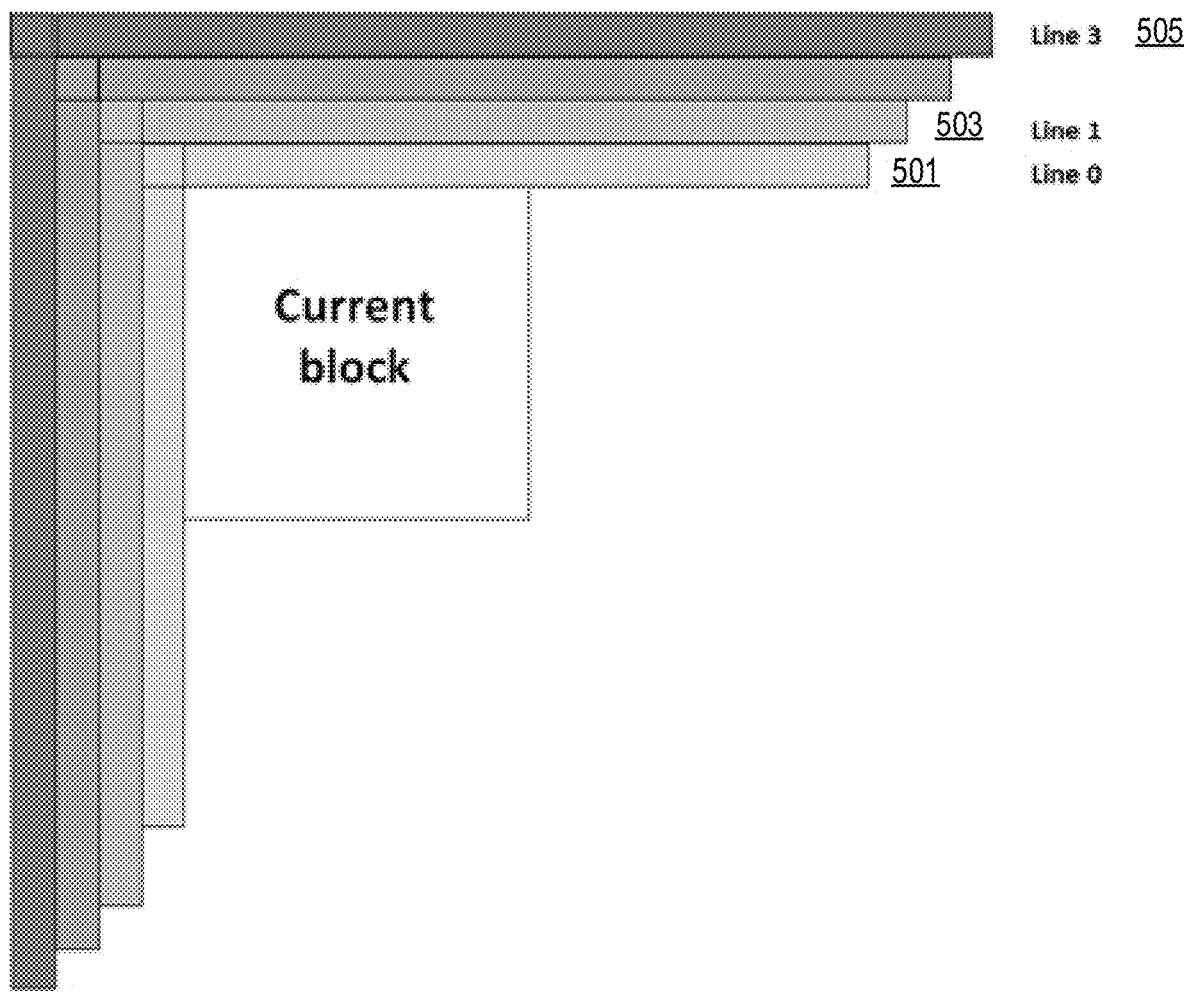
FIG. 5 illustrates a set of multiple reference lines for performing intra prediction.

FIG. 4 illustrates a set of exemplary intra modes 400 for use with the VVC standard, and FIG. 5 illustrates a set of multiple reference lines for performing intra prediction. With reference to FIG. 4, the set of exemplary intra modes 400 includes modes 0, 1, −14, −12, −10, −8, −6, −4, −2, 2, 4, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, and 80. Mode 0 corresponds to the Planar mode, and mode 1 corresponds to the DC mode. Similar to the intra prediction process of the HEVC standard, all of the defined intra modes (i.e., planar, DC and angular directions) in the VVC standard utilize a set of neighboring reconstructed samples above and left to the predicted block as the reference for intra prediction. However, unlike the HEVC standard where only the nearest row/column (line 0, 501 of FIG. 5) of reconstructed samples is used as reference, a multi reference line (MRL) is introduced in the VVC where two additional rows/columns (i.e., line 1, 503 and line 3, 505 of FIG. 5) are used for the intra prediction process. The index of the selected reference row/column is signaled from the encoder 100 (FIG. 1) to the decoder 200 (FIG. 2). When a non-nearest row/column is selected in FIG. 5, such as line 1503 or line 3505, the planar and DC modes of FIG. 4 are excluded from the set of intra modes that can be used to predict the current block.

Figure 6A:
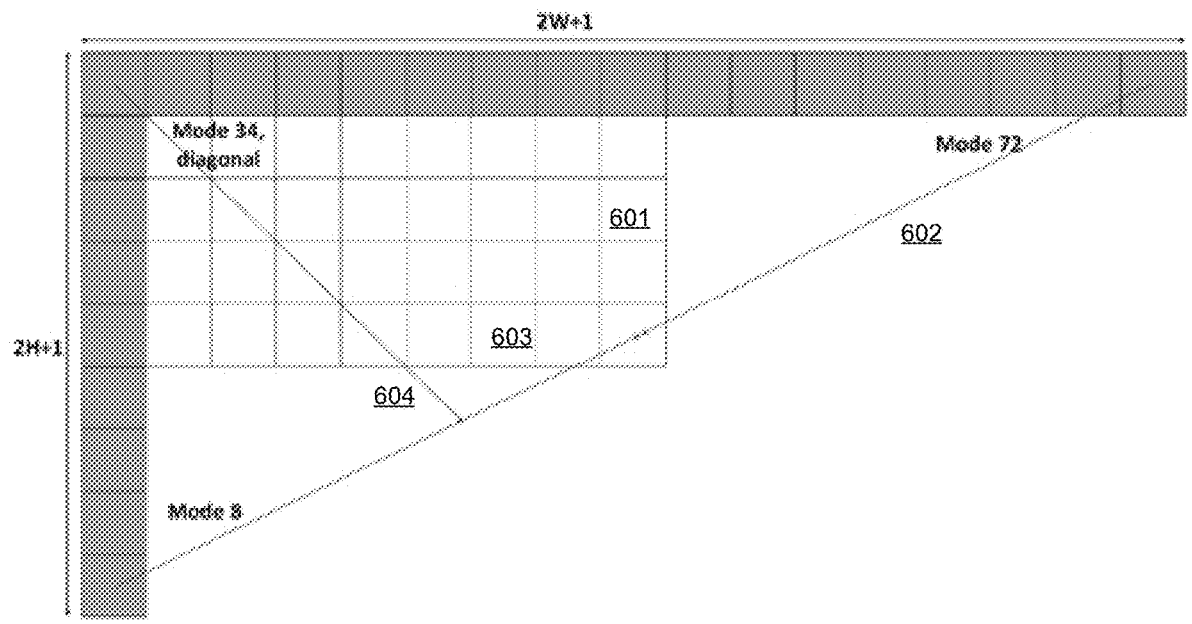
FIG. 6A illustrates a first set of reference samples and angular directions that are used for performing an intra prediction of a first rectangular block.
Figure 6B:
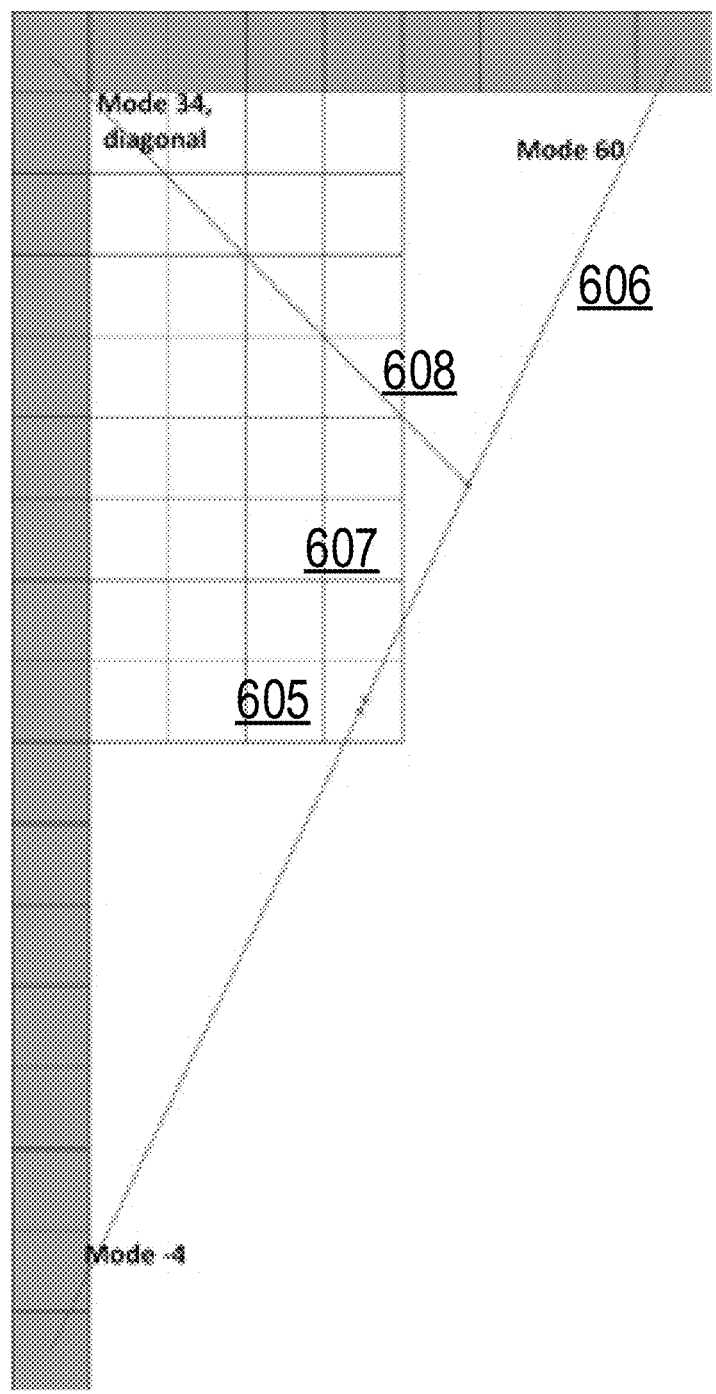
FIG. 6B illustrates a second set of reference samples and angular directions that are used for performing an intra prediction of a second rectangular block.
Figure 6C:
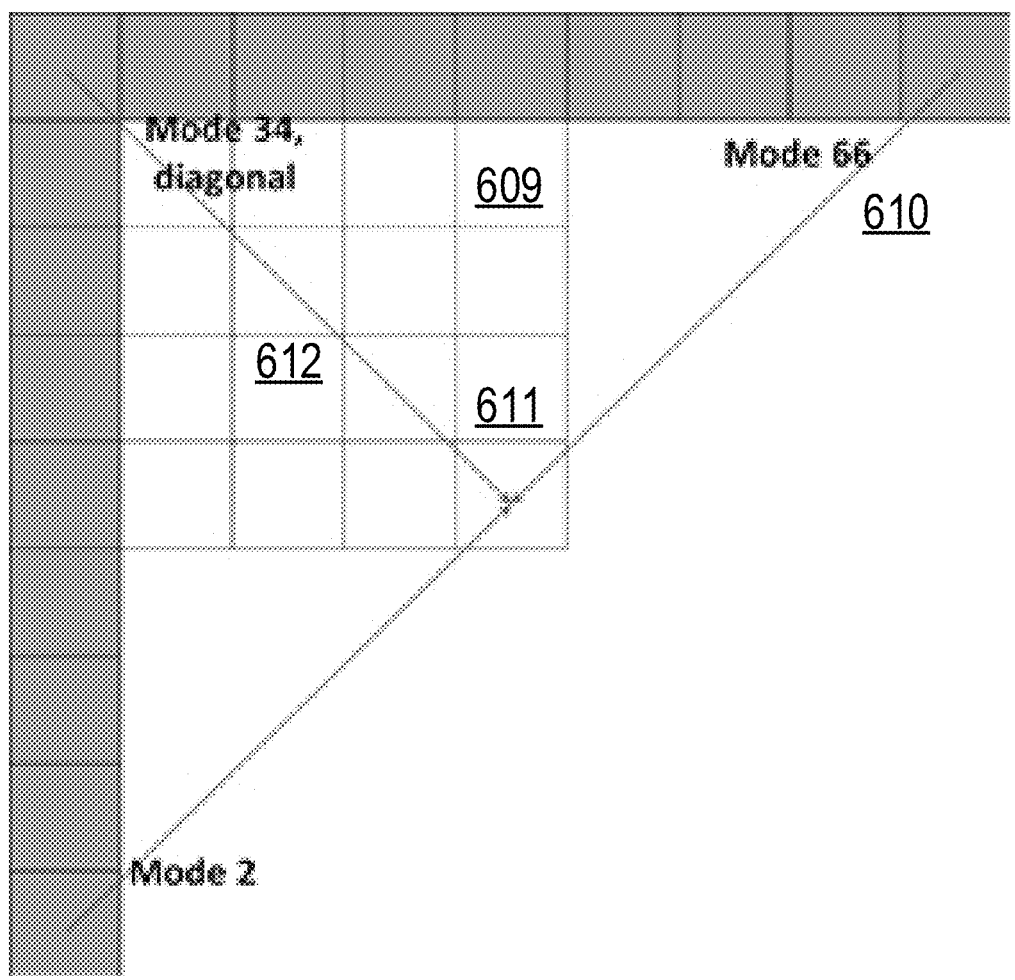
FIG. 6C illustrates a third set of reference samples and angular directions that are used for performing an intra prediction of a square block.

FIG. 6A illustrates a first set of reference samples and angular directions 602, 604 that are used for an intra prediction of a rectangular block (width W divided by height H equals 2). The first set of reference samples includes a first sample 601 and a second sample 603. FIG. 6B illustrates a second set of reference samples and angular directions 606, 608 that are used for an intra prediction of a tall rectangular block (W/H=½). The second set of reference samples includes a third sample 605 and a fourth sample 607. FIG. 6C illustrates a third set of reference samples and angular directions 610 and 612 that are used for an intra prediction of a square block (W=H). The third set of reference samples includes a fifth sample 609 and a sixth sample 610. Assuming utilization of the nearest neighbors, FIG. 6C illustrates the locations of the third reference samples that can be used in the VVC standard to derive the predicted samples of one intra block. As shown in FIG. 6C, because the quad/binary/ternary tree partition structure is applied, in addition to the coding blocks of square shape, rectangular coding blocks also exist for the intra prediction procedure in the context of the VVC standard.

Due to the unequal width and height of one given block, various set of angular directions are selected for different block shapes, which is also called wide-angle intra prediction. Specifically, for both square and rectangular coding blocks, besides planar and DC modes, 65 out of 93 angular directions are also supported for each block shape, as shown in Table 1. Such a design can not only efficiently capture the directional structures that are typically present in video (by adaptively selecting angular directions based on block shapes) but also ensure that a total of 67 intra modes (i.e., planar, DC and 65 angular directions) are enabled for each coding block. This can achieve a good efficiency of signaling intra modes, while providing a consistent design across different block sizes.

TABLE 1

The selected angular directions for the intra prediction of different block shapes in the VVC

| Block shape | Aspect ratio | Selected angular directions |
| --- | --- | --- |
| Square, W = H | W/H == 1 | 2~66 |
| Flat rectangle, W > H | W/H == 2 | 8~72 |
| | W/H == 4 | 12~76 |
| | W/H == 8 | 14~78 |
| | W/H == 16 | 16~80 |
| | W/H == 32 | 17~81 |
| Tall rectangle, W < H | W/H == ½ | −4~60 |
| | W/H == ¼ | −8~56 |
| | W/H == ⅛ | −10~54 |
| | W/H == ¹⁄₁₆ | −12~52 |
| | W/H == ¹⁄₃₂ | −13~51 |

Position-Dependent Intra Prediction Combination

As mentioned earlier, the intra prediction samples are generated from either a non-filtered or a filtered set of neighboring reference samples, which may introduce discontinuities along the block boundaries between the current coding block and its neighbors. To resolve such problems, boundary filtering is applied in the HEVC standard by combing the first row/column of prediction samples of DC, horizontal (i.e., mode 18 of FIG. 4) and vertical (i.e., mode 50) prediction modes with the unfiltered reference samples, utilizing a 2-tap filter (for DC mode) or a gradient-based smoothing filter (for horizontal and vertical prediction modes).

The position-dependent intra prediction combination (PDPC) tool in the VVC standard extends the foregoing concept by employing a weighted combination of intra prediction samples with unfiltered reference samples. In the current VVC working draft, the PDPC is enabled for the following intra modes without signaling: planar, DC, horizontal (i.e, mode 18), vertical (i.e., mode 50), angular directions close to the bottom-left diagonal directions (i.e., modes 2, 3, 4, . . . , 10) and angular directions close to the top-right diagonal directions (i.e., modes 58, 59, 60, . . . , 66). Assuming the prediction sample located as coordinate (x, y) is pred(x,y), its corresponding value after the PDPC is calculated as:

$$\text{pred}(x,y) = (wL \times R_{-1,y} + wT \times R_{x,-1} - wTL \times R_{-1,-1} + (64 - wL - wT + wTL) \times \text{pred}(x,y) + 32) >> 6 \quad (1)$$

where $R_{x,-1}$, $R_{-1,y}$ represent the reference samples located at the top and left of current sample (x, y), respectively, and $R_{-1,-1}$ represents the reference sample located at the top-left corner of the current block.

Figure 7:
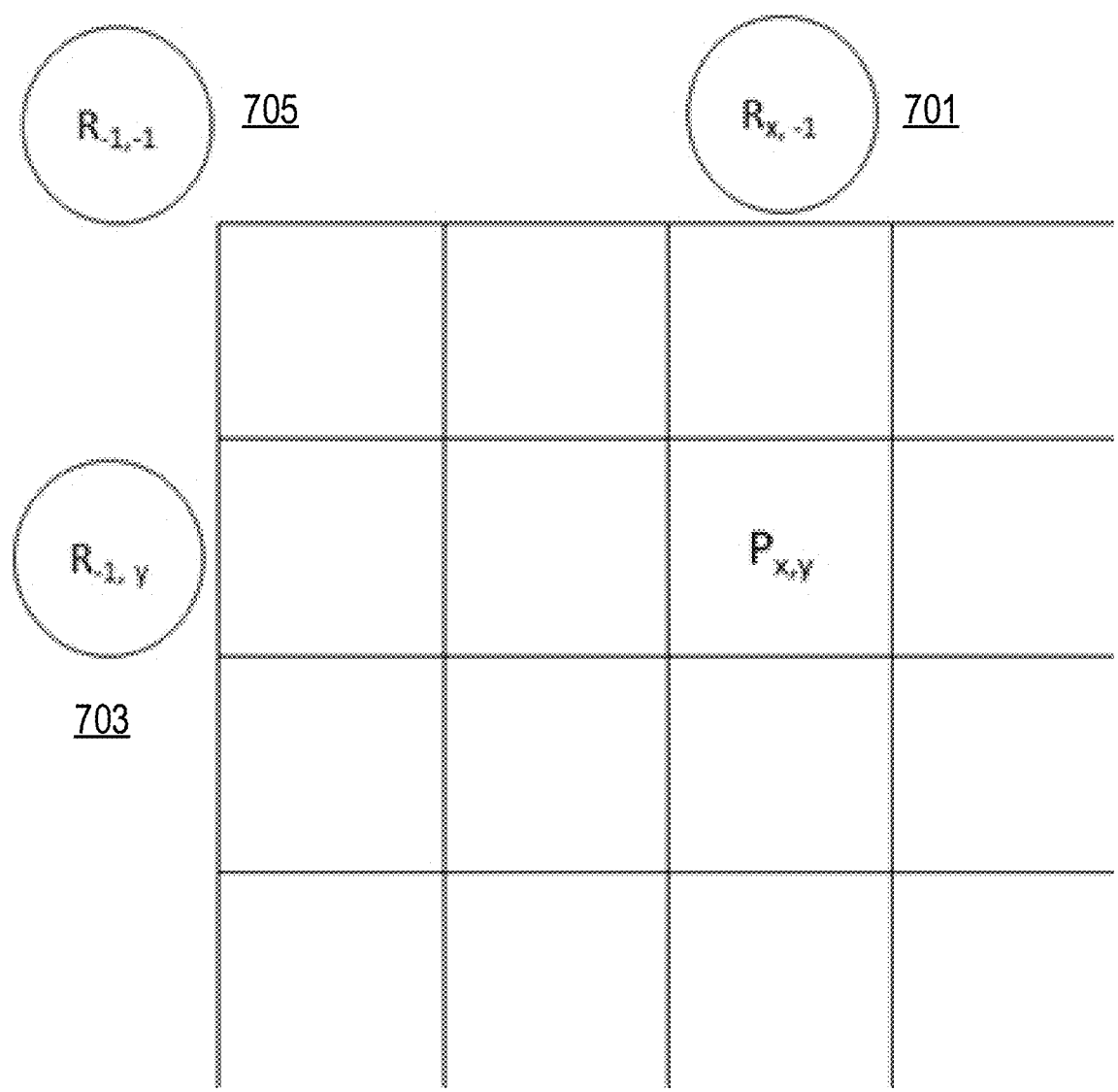
FIG. 7 illustrates a set of exemplary locations for neighboring reconstructed samples that are used for a position-dependent intra prediction combination (PDPC) of one coding block.

FIG. 7 illustrates a set of exemplary locations for neighboring reconstructed samples that are used for a position-dependent intra prediction combination (PDPC) of one coding block. A first reference sample 701 ($R_{x,-1}$), represents a reference sample located at the top of a current prediction sample (x, y). A second reference sample 703 ($R_{-1,y}$) represents a reference sample located to the left of the current prediction sample (x, y). A third reference sample 705 ($R_{-1,-1}$) represents the reference sample located at the top-left corner of the current prediction sample (x, y).

Reference samples including the first, second, and third reference samples 701, 703 and 705 are combined with the current prediction sample (x, y) during the PDPC process. The weights wL, wT and wTL in equation (1) are adaptively selected depending on prediction mode and sample position, as described as follows where the current coding block is assumed to be in the size of W×H:

For the DC mode, $$wT=32>>((y<<1)>>\text{shift}), wL=32>>((x<<1)>>\text{shift}),$$
$$wTL=(wL>>4)+(wT>>4) \quad (2)$$

For the planar mode, $$wT=32>>((y<<1)>>\text{shift}), wL=32>>((x<<1)>>\text{shift}),$$
$$wTL=0 \quad (3)$$

For the horizontal mode:

$$wT=32>>((y<<1)>>\text{shift}), wL=32>>((x<<1)>>\text{shift}),$$
$$wTL=wT \quad (4)$$

For the vertical mode:

$$wT=32>>((y<<1)>>\text{shift}), wL=32>>((x<<1)>>\text{shift}),$$
$$wTL=wL \quad (5)$$

For bottom-left diagonal directions:

$$wT=16>>((y<<1)>>\text{shift}), wL=16>>((x<<1)>>\text{shift}),$$
$$wTL=0 \quad (6)$$

For top-right diagonal directions:

$$wT=16>>((y<<1)>>\text{shift}), wL=16>>((x<<1)>>\text{shift}),$$
$$wTL=0 \quad (7)$$

where $\text{shift}=(\log_2(W)-2+\log_2(H)-2+2)>>2$.

Multiple Transform Selection and Shape Adaptive Transform Selection

In addition to DCT-II transform that is used in the HEVC standard, multiple transform selection (MTS) tool is enabled in the VVC standard by introducing additional core transforms of DCT-VIII and DST-VII. In the VVC standard, the adaptive selection of the transforms is enabled at the coding block level by signaling one MTS flag to a bitstream. Specifically, when the MTS flag is equal to 0 for one block, one pair of fixed transforms (e.g., DCT-II) are applied in the horizontal and vertical directions. Otherwise (when the MTS flag is equal to 1), two additional flags will be further signaled for the block to indicate the transform type (either DCT-VIII or DST-VII) for each direction.

On the other hand, due to the introduction of quad/binary/ternary-tree based block partitioning structure in the VVC standard, the distribution of the residuals of intra prediction is highly correlated with the block shape. Therefore, when the MTS is disabled (i.e., the MTS flag is equal to 0 for one coding block), one shape-adaptive transform selection method is applied to all intra-coded blocks in which the DCT-II and DST-VII transforms are implicitly enabled based on the width and height of the current block. More specifically, for each rectangular block, the method uses the DST-VII transform in the direction associated with shorter side of one block and DCT-II transform in the direction associated with longer side of the block. For each square block, the DST-VII is applied in both directions. Additionally, to avoid introducing new transforms in different block sizes, the DST-VII transform is only enabled when the shorter side of one intra-coded block is equal to or smaller than 16. Otherwise, the DCT-II transform is always applied.

Table 2 illustrates the enabled horizontal and vertical transforms for intra-coded blocks based on the shape adaptive transform selection method in the VVC.

TABLE 2

Shape adaptive transform selection for intra blocks in the VVC

| Block size | | Horizontal trans. | Vertical trans. |
|---|---|---|---|
| min(W, H) > 16 | | DCT-II | DCT-II |
| min(W, H) ≤ 16 | W = H | DST-VII | DST-VII |
| | W > H | DCT-II | DST-VII |
| | W < H | DST-VII | DCT-II |

Intra Sub-Partition Coding Mode

Conventional intra mode only utilizes the reconstructed samples that neighbor one coding block to generate the intra prediction samples of that block. Based on such a method, the spatial correlation between the predicted samples and the reference samples is roughly proportional to the distance between the predicted samples and the reference samples. Therefore, the samples at the inner portion (especially the samples located at the bottom-right corner of the block) usually have a lower prediction quality than the samples that are close to the block boundaries. To further improve the intra prediction efficiency, short-distance intra prediction (SDIP) was proposed and studied well. The method divides one intra coding block horizontally or vertically into multiple sub-blocks for prediction. Usually, a square block is divided into four sub-blocks. For example, an 8×8 block may be divided into four 2×8 or four 8×2 sub-blocks. One extreme case of such sub-block based intra prediction is so-called line-based prediction, wherein a block is divided into 1-D line/column for prediction. For example, one W×H (width×height) block can be split either into H sub-blocks in size of W×1 or into W sub-blocks in size of 1×H for intra prediction. Each of the resulting lines/columns are coded in the same way of a normal 2-dimension (2-D) block (as shown in FIGS. 6A, 6B, 6C, and 7), i.e., it is predicted by one of available intra modes and the prediction error is decorrelated based on transform and quantization and sent to the decoder 200 (FIG. 2) for reconstruction. Consequently, the reconstructed samples in one sub-block (e.g. a line/column) can be used as references to predict the samples in the next sub-block. The above process is repeated until all of the sub-blocks within the current block are predicted and coded. Additionally, to reduce the signaling overhead, all the sub-blocks within one coding block shares the same intra mode.

With SDIP, different sub-block partitions may provide different coding efficiencies. In general, line-based prediction offers the best coding efficiency because it provides "the shortest prediction distance" among different partitions. On the other hand, it also has the poorest encoding/decoding throughput for codec hardware implementations. For example, considering a block with 4×4 sub-blocks versus the same block with 4×1 or 1×4 sub-blocks, the latter case is only one fourth of the throughput of the former case. In HEVC, the smallest intra prediction block size for luma is 4×4.

Figure 8A:
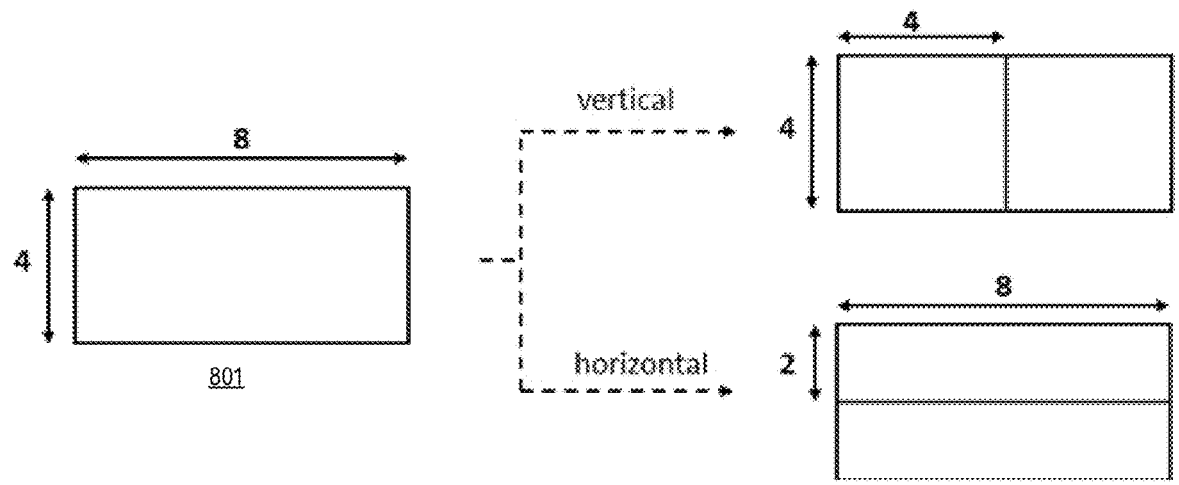
FIG. 8A illustrates an exemplary set of short-distance intra prediction (SDIP) partitions for an 8×4 block.
Figure 8B:
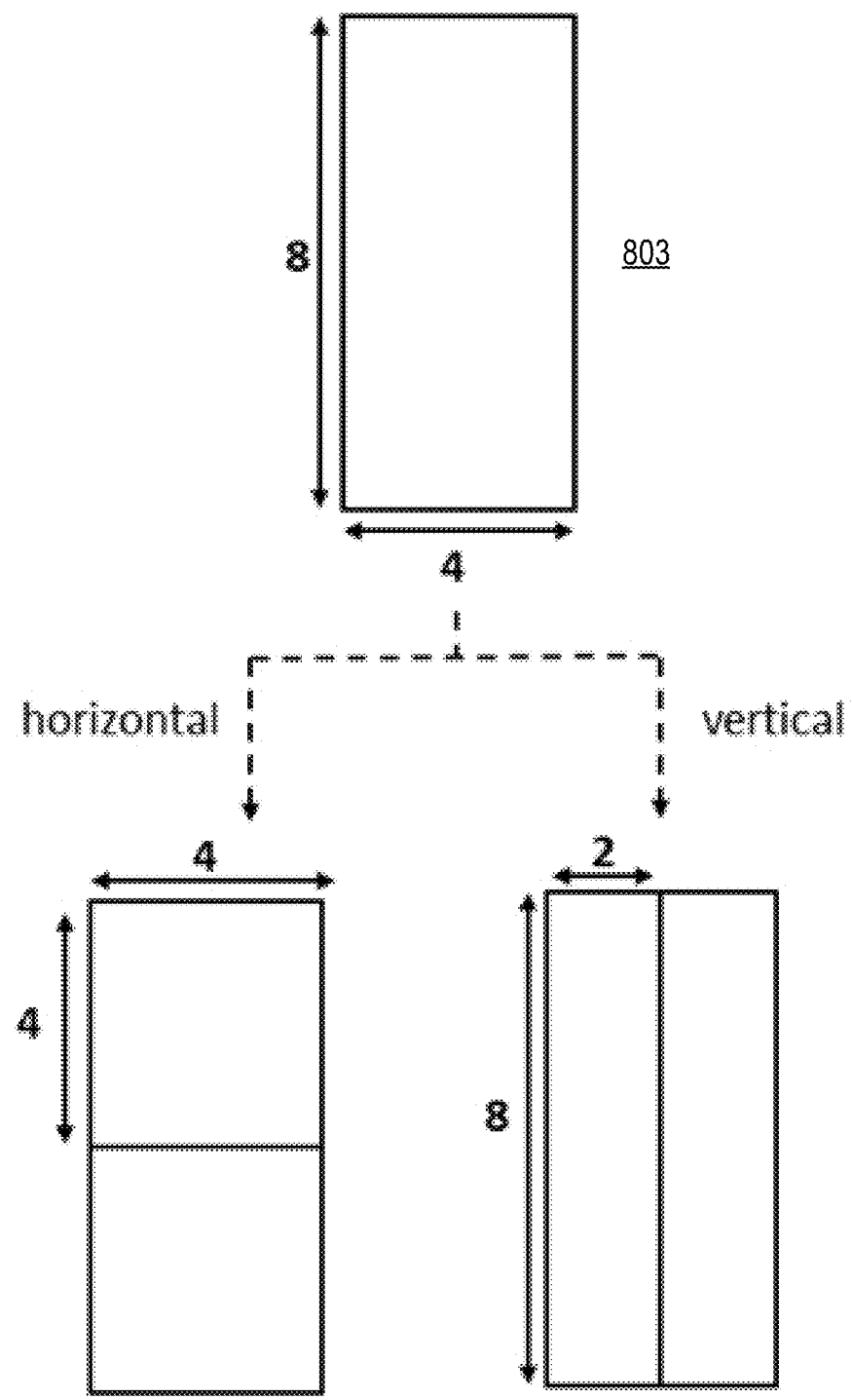
FIG. 8B illustrates an exemplary set of short-distance intra prediction (SDIP) partitions for a 4×8 block.
Figure 8C:
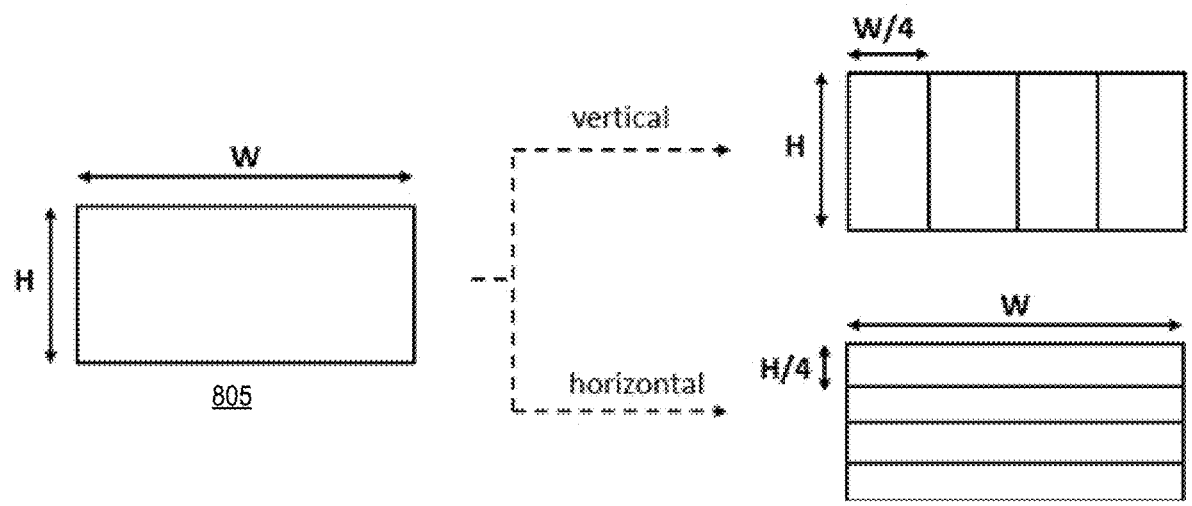
FIG. 8C illustrates an exemplary set of short-distance intra prediction (SDIP) partitions for an arbitrarily-sized block.

FIG. 8A illustrates an exemplary set of short-distance intra prediction (SDIP) partitions for an 8×4 block 801, FIG. 8B illustrates an exemplary set of short-distance intra prediction (SDIP) partitions for a 4×8 block 803, and FIG. 8C illustrates an exemplary set of short-distance intra prediction (SDIP) partitions for an arbitrarily-sized block 805. Recently, a video coding tool called sub-partition prediction (ISP) was introduced into the VVC standard. Conceptually, ISP is very similar to SDIP. Specifically, depending on the block size, the ISP divides the current coding block into 2 or 4 sub-blocks in either a horizontal or vertical direction, and each sub-block contains at least 16 samples.

Taken together, FIGS. 8A, 8B, and 8C illustrate all of the possible partition cases for different coding block sizes. Moreover, the following main aspects are also included in the current ISP design to handle its interaction with the other coding tools in the VVC standard:

Interaction with wide-angle intra direction: the ISP is combined with the wide-angle intra direction. In the current design, the block size (i.e., the width/height ratio) that is used to determine whether a normal intra direction or its corresponding wide-angle intra direction should be applied is the one of the original coding block, i.e., the block before sub-block partitions.

Interaction with multiple reference line: the ISP cannot be jointly enabled with the multiple reference line. Specifically, in the current VVC signaling design, the ISP enabling/disabling flag is signaled after the MRL index. When one intra block has one non-zero MRL index (i.e., referring to non-nearest neighboring samples), the ISP enabling/disabling flag is not signaled but inferred as 0, i.e. ISP is automatically disabled for the coding block in this case.

Interaction with most probable mode: similar to normal intra mode, the intra mode that is used for one ISP block is signaled through the most probable mode (MPM) mechanism. However, compared to the normal intra mode, the following modifications are made to the MPM method for ISP: 1) each ISP block only enables the intra modes that are included in the MPM list and disables all the other intra modes that are not in the MPM list; 2) for each ISP block, its MPM list excludes the DC mode and prioritizes the horizontal intra modes for ISP horizontal partition and vertical modes for ISP vertical partition respectively.

At least one non-zero coefficients block flag (CBF): In current VVC, a CBF flag is signaled for each transform unit (TU) to specify that the transform block contains one or more transform coefficient levels not equal to 0. Given a certain block using ISP, the decoder will assume that at least one of the sub-partitions has a non-zero CBF. For this reason, if n is the number of sub-partitions and the first n–1 sub-partitions have produced a zero CBF, then the CBF of the n-th sub-partition will be inferred to be 1. Therefore, it is not necessary to transmit and decode it.

Interaction with multiple transform selection: the ISP is exclusively applied with the MTS, i.e., when one coding block uses ISP, its MTS flag is not signaled but always inferred as 0, i.e., disabled. However, instead of always using the DCT-II transform, a fixed set of core transforms (including DST-VII and DCT-II) are implicitly applied to ISP coded blocks based on the block sizes. Specifically, assuming W and H are the width and height of one ISP sub-partition, its horizontal and vertical transforms are selected according to the following rules as described in Table 3.

TABLE 3

The selected horizontal and vertical transforms for ISP blocks

| Sub-block size | Intra mode | Horizontal trans. | Vertical trans. |
| --- | --- | --- | --- |
| W = 2 or W > 32 | All available intra modes | DCT-II | DCT-II |
| H = 2 or H > 32 | All available intra modes | DCT-II | DCT-II |
| The other sub-block sizes | Planar, 31, 32, 34, 36, 37 | DCT-II | DCT-II |
| | DC, 33, 35 | DST-VII | DCT-II |
| | 2, 4, 6 . . . 28, 30, 39, 41, 43 . . . 63, 65 | DST-VII | DCT-II |

Cross-Component Linear Model Prediction

Figure 9A:
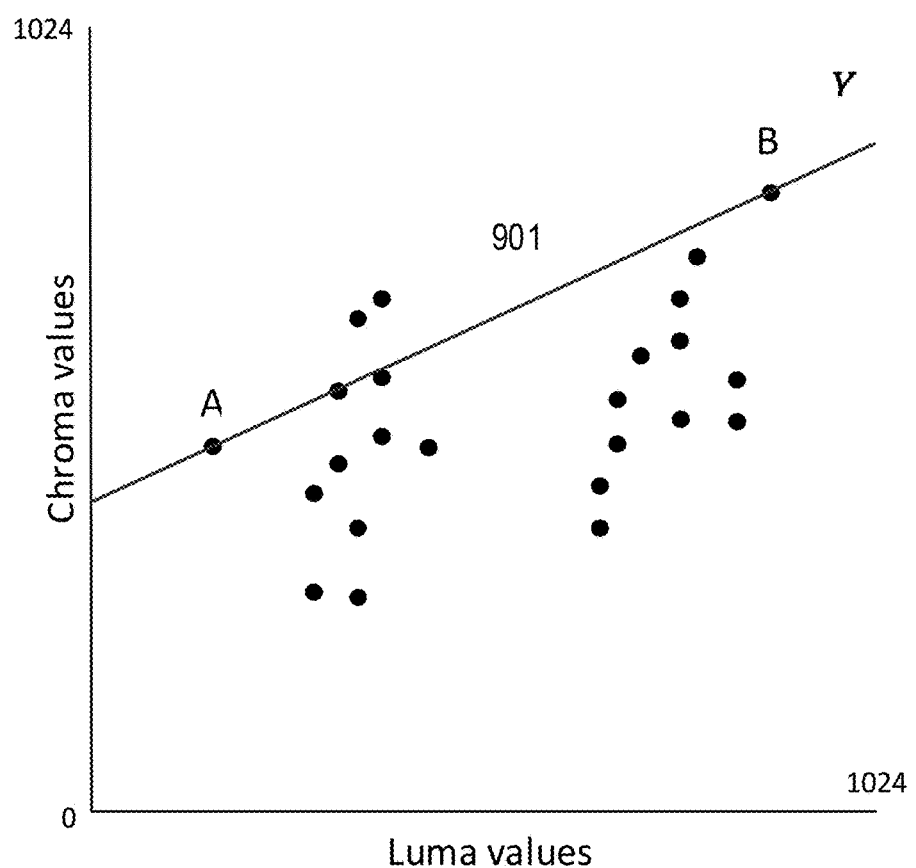
FIG. 9A is a plot of chroma values as a function of luma values, where the plot is used to derive a set of linear model parameters.

FIG. 9A is a plot of chroma values as a function of luma values, where the plot is used to derive a set of linear model parameters. More specifically, a straight-line 901 relationship between chroma values and luma values is used to derive a set of linear model parameters α and β as follows. To reduce the cross-component redundancy, a cross-component linear model (CCLM) prediction mode is used in VVC, for which the chroma samples are predicted based on the reconstructed luma samples of the same CU by using a linear model as follows:

$$\text{pred}_C(i,j) = \alpha \cdot \text{rec}_L'(i,j) + \beta \quad (8)$$

where $\text{pred}_C(i, j)$ represents the predicted chroma samples in a CU and $\text{rec}_L'(i, j)$ represents the downsampled reconstructed luma samples of the same CU. Linear model parameters α and β are derived from the straight-line 901 relationship between luma values and chroma values from two samples, which are minimum luma sample A $(X_A, Y_A)$ and maximum luma sample B $(X_B, Y_B)$ inside the set of neighboring luma samples, as exemplified in FIG. 9A. Here $X_A, Y_A$ are the x-coordinate (i.e. luma value) and y-coordinate (i.e. chroma value) value for sample A, and $X_B, Y_B$ are the x-coordinate and y-coordinate value for sample B. The linear model parameters α and β are obtained according to the following equations.

$$\alpha = \frac{y_B - y_A}{x_B - x_A}$$
$$\beta = y_A - \alpha x_A$$

Such a method is also called a min-Max method. The division in the equation above could be avoided and replaced by a multiplication and a shift.

Figure 9B:
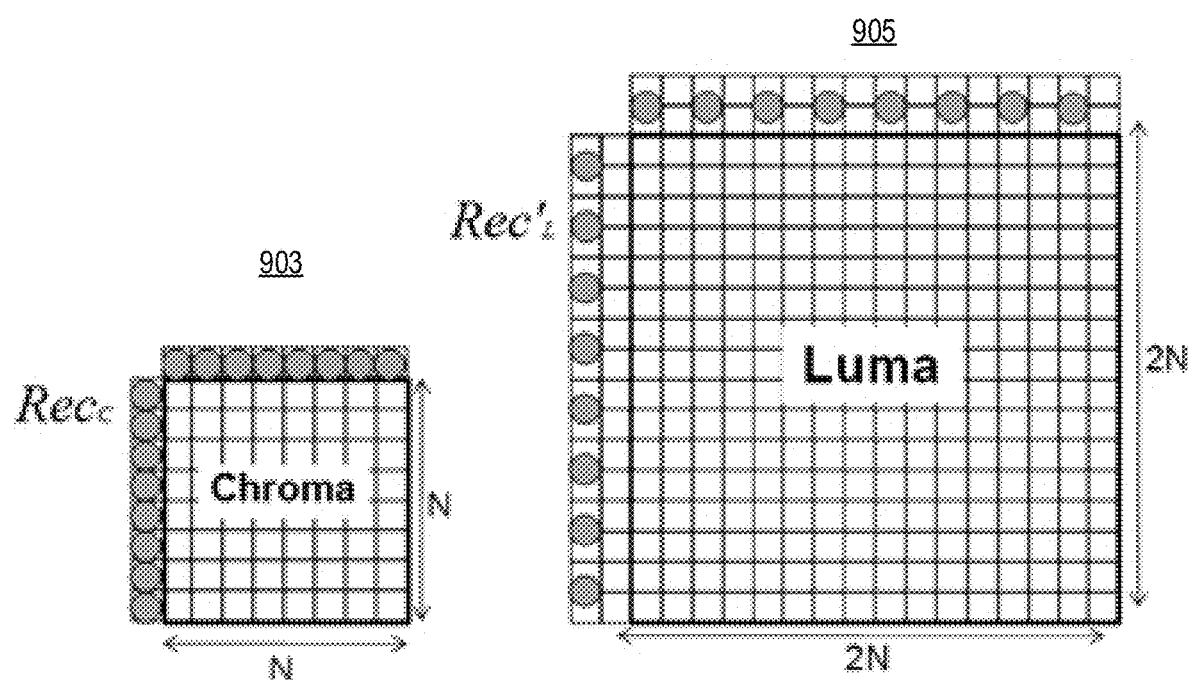
FIG. 9B shows the locations of samples that are used for the derivation of the linear model parameters of FIG. 9A.

FIG. 9B shows the locations of the samples that are used for the derivation of the linear model parameters of FIG. 9A. For a coding block with a square shape, the above two equations for the linear model parameters α and β are applied directly. For a non-square coding block, the neighboring samples of the longer boundary are first subsampled to have the same number of samples as for the shorter boundary. FIG. 9B shows the locations of the left and above samples and the sample of the current block involved in the CCLM mode, including an N×N set of chroma samples 903 and a 2N×2N set of luma samples 905. Besides using the above template and the left template to calculate the linear model coefficients together, these templates also can be used alternatively in the other 2 LM modes, called LM_A, and LM_L modes.

In LM_A mode, only pixel samples in the above template are used to calculate the linear model coefficients. To get more samples, the above template is extended to (W+W). In LM_L mode, only pixel samples in the left template are used to calculate the linear model coefficients. To get more samples, the left template are extended to (H+H). Note that only one luma line (general line buffer in intra prediction) is used to make the down-sampled luma samples when the upper reference line is at the CTU boundary.

For chroma intra mode coding, a total of 8 intra modes are allowed for chroma intra mode coding. Those modes include five traditional intra modes and three cross-component linear model modes (CCLM, LM_A, and LM_L). Chroma mode signaling and derivation process are shown in Table 4. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

TABLE 4

Derivation of chroma prediction mode from luma mode when CCLM_is enabled

| Chroma prediction mode | Corresponding luma intra prediction mode | | | | |
|---|---|---|---|---|---|
| | 0 | 50 | 18 | 1 | X ( 0 <= X <= 66 ) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 0 | 50 | 18 | 1 | X |

Although the ISP tool in VVC can enhance intra prediction efficiency, there is room to further improve the performance of VVC. Meanwhile, some parts of the existing ISP would benefit from further simplification to provide for more efficient codec hardware implementations, and/or to provide improved coding efficiency. In this disclosure, several methods are proposed to further improve the ISP coding efficiency, to simplify the existing ISP design, and/or to facilitate improved hardware implementations.

Independent (or Parallel) Sub-Partition Predictor Generation for the ISP

Figure 10:
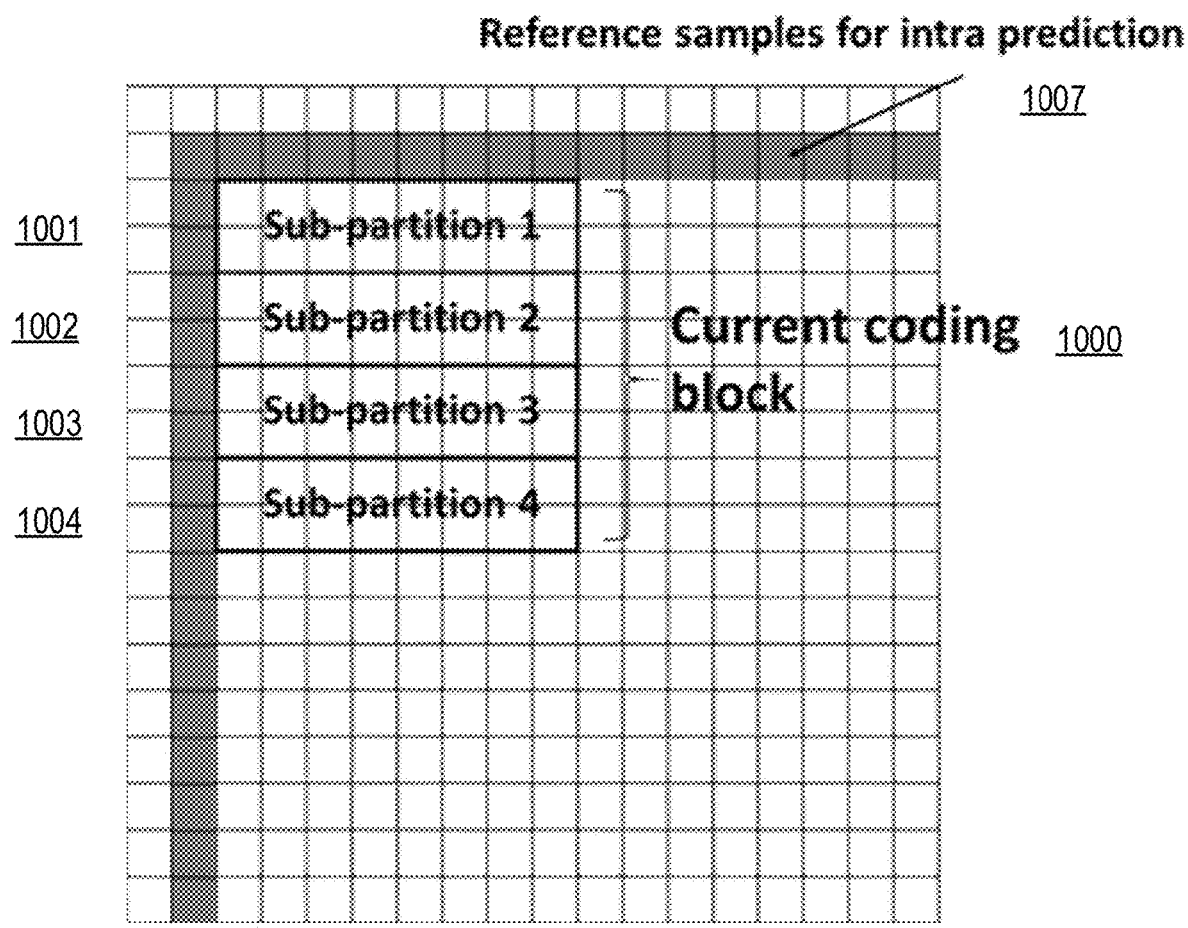
FIG. 10 illustrates the generation of reference samples for intra prediction for all sub-partitions using only reference samples outside of a current coding block.

FIG. 10 illustrates the generation of reference samples for intra prediction 1007 for all sub-partitions using only reference samples outside of a current coding block 1000. The current coding block 1000 includes a first sub-partition 11001, a second sub-partition 21002, a third sub-partition 31003, and a fourth sub-partition 41004. In this disclosure, it is proposed to generate an intra prediction for each sub-partition 1001, 1002, 1003, and 1004 independently. In other words, all of the predictors for the sub-partitions 1001, 1002, 1003, and 1004 can be generated in a parallel manner. In one embodiment, the predictors for all the sub-partitions are generated using the same approaches as used in the conventional non-sub-partition intra modes. Specifically, no reconstructed samples of one sub-partition are used to generate the intra prediction samples for any other sub-partition in the same coding unit; all the predictors of each sub-partition 1001, 1002, 1003, 1004 are generated using the reference samples of the current coding block 1000 as shown in FIG. 10.

For the ISP mode in the VVC standard, the width of each sub-partition can be smaller than or equal to two. One detailed example is as follows. Pursuant to the ISP mode in the VVC standard, the dependence of 2×N (width by height) subblock prediction on reconstructed values of previously decoded 2×N subblocks of the coding block is not allowed so that the minimum width for prediction for subblocks becomes four samples. For example, an 8×8 coding block that is coded using ISP with vertical split is split into four prediction regions each of size 2×8, and the left two 2×8 prediction regions are merged into a first 4×8 prediction region to perform intra prediction. Transform 102 (FIG. 1) circuitry is applied to each 2×8 partition.

Pursuant to this example, the right two 2×8 prediction regions are merged into a second 4×8 prediction region to perform intra prediction. Transform 102 circuitry is applied to each 2×8 partition. It is noted that the first 4×8 prediction region uses the neighboring pixels of the current coding block to generate the intra predictors, while the second 4×8 region uses the reconstructed pixels from the first 4×8 region (located to the left of the second 4×8 region) or the neighboring pixels from the current coding block (located to the top of the second 4×8).

In another embodiment, only the horizontal (HOR) prediction mode (shown as mode 18 in FIG. 4), as well as those prediction modes having mode indices smaller than 18 (as indicated in FIG. 4) may be used in forming the intra prediction of the horizontal sub-partitions; and only the vertical (VER) prediction mode (i.e. mode 50 in FIG. 4), and those prediction modes having mode indices larger than 50 (as indicated in FIG. 4) may be used in forming the intra prediction of the vertical sub-partitions. As a result, with the HOR prediction mode (shown as mode 18 in FIG. 4), and all of the angular prediction modes with modes smaller than 18, the intra prediction for each horizontal sub-partition can be performed independently and in parallel. Likewise, with the VER prediction mode (mode 50 in FIG. 4), and all of the angular prediction modes with modes larger than 50, the intra prediction for each vertical sub-partition can be performed independently and in parallel.

Intra Prediction Mode Coding for the Luma Component for ISP

In this disclosure, it is proposed to allow only N modes out of all possible intra prediction modes for the luma component for an ISP-coded block (N being a positive integer). In one embodiment, only one mode is allowed for the luma component of an ISP-coded block. For example, this single allowed mode may be Planar mode. In another example, this single allowed mode may be DC mode. In a third example, this single allowed mode may be one of HOR prediction mode, VER prediction mode, or diagonal (DIA) mode (mode 34 in FIG. 4) intra prediction mode.

In another embodiment, only one mode is allowed for the luma component of an ISP coded block, and this mode may be different according to the sub-partition orientation, i.e. whether it is a horizontal or vertical sub-partition. For example, only the HOR prediction mode is allowed for the horizontal sub-partitioning, while only the VER prediction mode is allowed for the vertical sub-partitioning. In yet another example, only the VER prediction mode is allowed for the horizontal sub-partitioning, while only the HOR prediction mode is allowed for the vertical sub-partitioning.

In yet another embodiment, only two modes are allowed for the luma component of an ISP-coded block. Each of respective modes may be selected in response to a corresponding sub-partition orientation, i.e. whether the orientation of the sub-partition is horizontal or vertical. For example, only PLANAR and HOR prediction modes are allowed for the horizontal sub-partitioning, while only PLANAR and VER prediction modes are allowed for the vertical sub-partitioning.

To signal the N modes allowed for the luma components of an ISP-coded block, the conventional most probable modes (MPM) mechanism is not utilized. Instead, we propose to signal the intra modes for the ISP coded block using the determined binary codewords for each intra mode. The codewords may be generated using any of a variety of different processes, including a Truncated Binary (TB) binarization process, a Fixed-length binarization process, a Truncated Rice (TR) binarization process, a k-th order Exp-Golomb binarization process, a Limited EGk binarization process, etc. These binary codeword generation processes are well defined in the specification of HEVC. The truncated Rice with Rice parameter equal to zero is also known as truncated unary binarization. One set of examples of codewords using different binarization methods is presented in Table 5.

TABLE 5

Binary Codewords Generated Using Different Binarization Methods

| N | Unary (U) | Truncated Unary (TrU) cMaxD 7 | Truncated Rice (TRk) k D 1;Max D 7 | Exp-Golomb (EGk) k D 0 | Fixed-Length (FL) cMaxD 7 |
|---|---|---|---|---|---|
| 0 | 0 | 0 | 00 | 1 | 000 |
| 1 | 10 | 10 | 01 | 010 | 001 |
| 2 | 110 | 110 | 100 | 011 | 010 |
| 3 | 1110 | 1110 | 101 | 00100 | 011 |
| 4 | 11110 | 11110 | 1100 | 00101 | 100 |
| 5 | 111110 | 111110 | 1101 | 00110 | 101 |
| 6 | 1111110 | 1111110 | 1110 | 00111 | 110 |
| 7 | 11111110 | 1111111 | 1111 | 0001000 | 111 |

Independent (or Parallel) Sub-Partition Predictor Generation for the ISP

In yet another embodiment, the MPM derivation process for the regular intra mode is directly re-used for ISP mode, and the signaling methods of the MPM flag and MPM index are kept the same as it is in the existing ISP design.

Intra Prediction Mode Coding for the Chroma Component for ISP

In this disclosure, it is proposed to only allow N, modes out of all possible chroma intra prediction modes for the chroma component for an ISP coded block (N, is a positive integer). In one embodiment, only one mode is allowed for the chroma component of an ISP coded block. For example, this single allowed mode may be a direct mode (DM). In another example, this single allowed mode may be an LM mode. In a third example, this single allowed mode may be one of the HOR prediction mode or the VER prediction mode. The direct mode (DM) is configured to apply the same intra prediction mode which is used by the corresponding luma block to the chroma blocks.

In another embodiment, only two modes are allowed for the chroma component of an ISP coded block. In one example, only DM and LM are allowed for the chroma components of an ISP coded block.

In yet another embodiment, only four modes are allowed for the chroma component of an ISP coded block. In one example, only DM, LM, LM_L and LM_A are allowed for the chroma components of an ISP coded block.

To signal the N, modes for the chroma components of an ISP coded block, the convention MPM mechanism is not utilized. Instead, fixed binary codewords are used to indicate the selected chroma modes in the bitstream. For example, the chroma intra prediction modes for an ISP coded block can be signaled using the determined binary codewords. The codewords may be generated using different processes including the Truncated Binary (TB) binarization process, the Fixed-length binarization process, the truncated Rice (TR) binarization process, the k-th order Exp-Golomb binarization process, the Limited EGk binarization process, etc.

Coding Block Size for the Chroma Components for ISP Coded Block

In this disclosure, it is proposed to NOT allow sub-partition coding for chroma components for an ISP coded block. Instead, the normal whole block-based intra prediction is used for the chroma components of an ISP coded block. In other words, for an ISP coded block, sub-partitioning is performed only for its luma component with no sub-partitioning on its chroma components.

Combination of ISP with Inter Prediction

Figure 11:
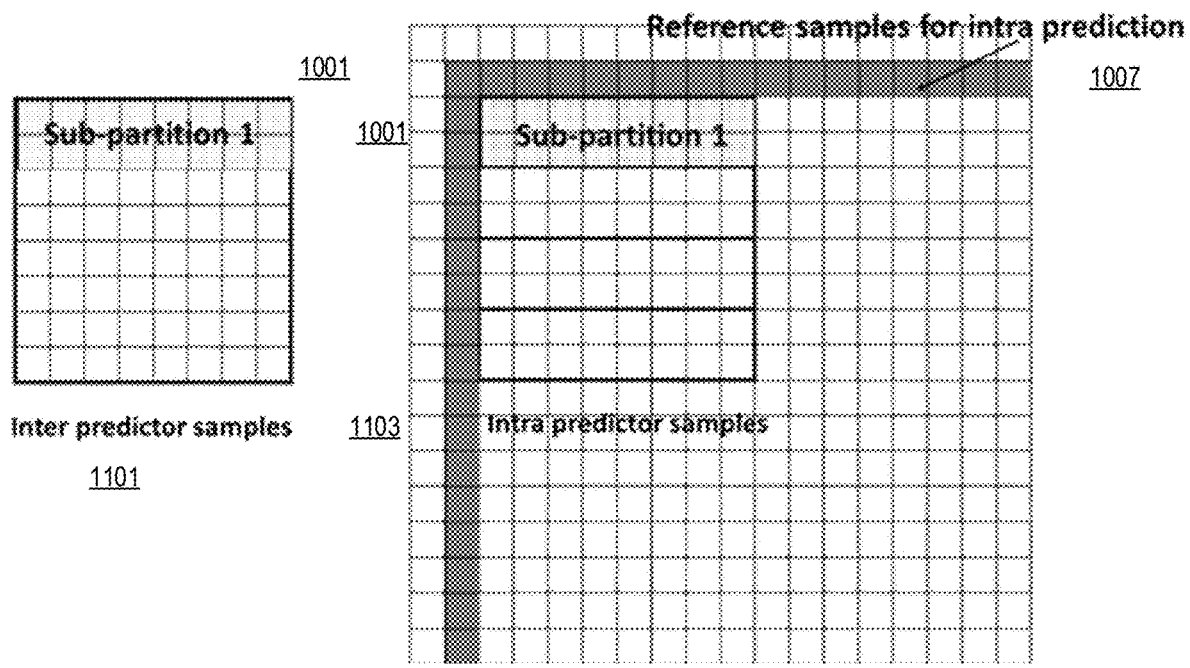
FIG. 11 illustrates a combining of inter predictor samples and intra predictor samples for a first sub-partition of FIG. 10.
Figure 12:
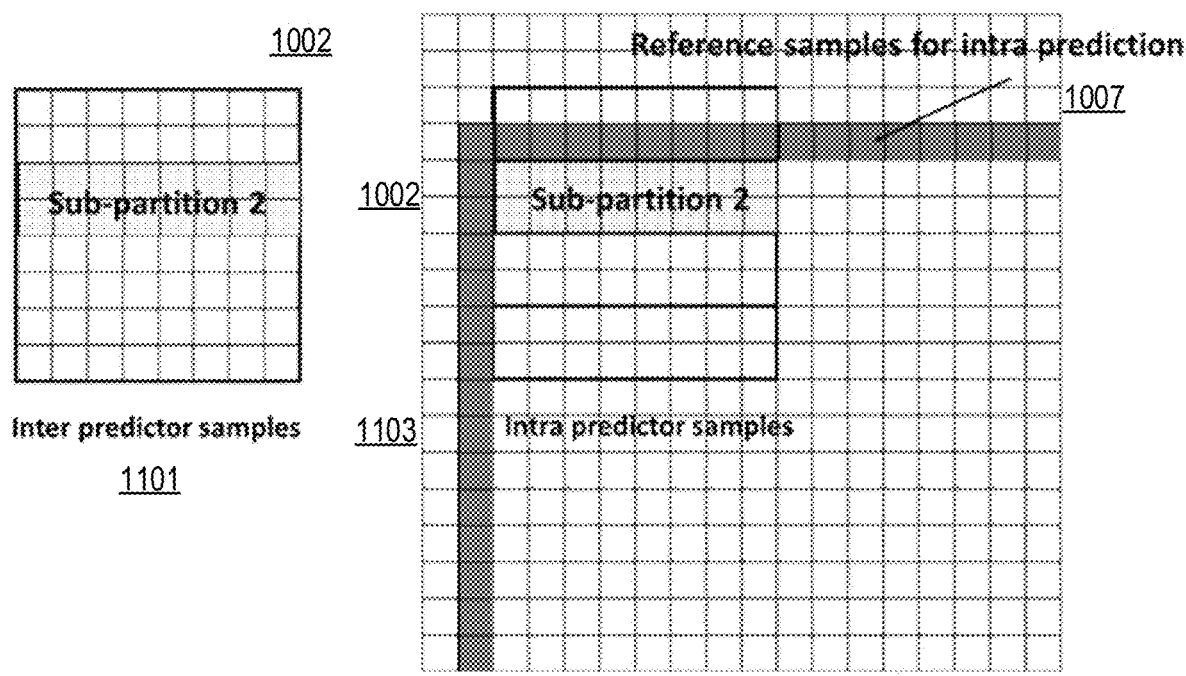
FIG. 12 illustrates a combining of inter predictor samples and intra predictions samples for a second sub-partition of FIG. 10.

FIG. 11 illustrates a combining of inter predictor samples and intra predictor samples for the first sub-partition 1001 of FIG. 10. Likewise, FIG. 12 illustrates a combining of inter predictor samples and intra predictions samples for the second sub-partition 1002 of FIG. 10. More specifically, to further improve coding efficiency, a new prediction mode is provided where the prediction is generated as a weighted combination (e.g. weighted averaging) of the ISP mode and the inter prediction mode. The intra predictor generation for ISP mode is the same as illustrated previously in connection with FIG. 10. The inter predictor may be generated through the process of merge mode or inter mode.

In the illustrative example of FIG. 11, the inter predictor samples 1101 for a current block (including all sub-partitions) is generated by performing motion compensation using the merge candidates indicated by the merge index. The intra predictor samples 1103 are generated by performing the intra prediction using the signaled intra mode. It is noted that this process may use the reconstructed samples of the previous sub-partition to generate the intra predictor samples for a non-first sub-partition (i.e., the second sub-partition 1002) as shown in FIG. 12. After the inter and intra predictor samples are generated, they are weight-averaged to generate the final predictor samples for the sub-partition. The combined modes can be treated as an intra mode. Alternatively, the combined modes may be treated as an inter mode or a merge mode instead of intra mode.

CBF Signaling for ISP Coded Block

To simplify the design of ISP, it is proposed in this disclosure to always signal CBF for the last sub-partition.

In another embodiment of this disclosure, it is proposed to not signal the CBF of the last sub-partition, but to infer its value at decoder side. For example, the value of CBF for the last sub-partition is always inferred as one. In another example, the value of CBF for the last sub-partition is always inferred as zero.

According to an embodiment of the present disclosure, a method of video coding comprises independently generating a respective intra prediction for each of a plurality of corresponding sub-partitions, wherein each respective intra prediction is generated using a plurality of reference samples from a current coding block.

In some examples, no reconstructed sample from a first sub-partition of the plurality of corresponding sub-partitions is used to generate a respective intra prediction for any other sub-partition of the plurality of corresponding sub-partitions.

In some examples, each of the plurality of corresponding sub-partitions has a width less than or equal to 2.

In some examples, the plurality of corresponding sub-partitions comprises a plurality of vertical sub-partitions and a plurality of horizontal sub-partitions, and the method further comprises using only a horizontal prediction mode to generate a first set of intra predictions for the plurality of horizontal subdivisions, and using only a vertical prediction mode to generate a second set of intra predictions for the plurality of vertical sub-partitions.

In some examples, the horizontal prediction mode is performed using a mode index smaller than 18.

In some examples, the vertical prediction mode is performed using a mode index larger than 50.

In some examples, the horizontal prediction mode is performed for each of the plurality of horizontal sub-partitions independently and in parallel.

In some examples, the vertical prediction mode is performed for each of the plurality of vertical sub-partitions independently and in parallel.

In some examples, the plurality of corresponding sub-partitions includes a last sub-partition, and the method further comprises signaling a coefficients block flag (CBF) value for the last sub-partition.

In some examples, the plurality of corresponding sub-partitions includes a last sub-partition, and the method further comprises inferring a coefficients block flag (CBF) value for the last sub-partition at a decoder.

In some examples, the coefficients block flag (CBF) value is always inferred as one.

In some examples, the coefficients block flag (CBF) value is always inferred as zero.

According to another embodiment of the present disclosure, a method of video coding comprises generating a respective intra prediction for each of a plurality of corresponding sub-partitions using only N modes out of M possible intra prediction modes for a luma component of an intra sub partition (ISP) coded block, wherein M and N are positive integers and N is less than M.

In some examples, each of the plurality of corresponding sub-partitions has a width less than or equal to 2.

In some examples, N is equal to one, such that only a single mode is allowed for the luma component.

In some examples, the single mode is a planar mode.

In some examples, the single mode is a DC mode.

In some examples, the single mode is any one of a horizontal (HOR) prediction mode, a vertical (VER) prediction mode, or a diagonal (DIA) prediction mode.

In some examples, the single mode is selected in response to a sub-partition orientation, wherein the horizontal (HOR) prediction mode is selected in response to the sub-partition orientation being horizontal, and wherein the vertical (VER) prediction mode is selected in response to the sub-partition orientation being vertical.

In some examples, the single mode is selected in response to a sub-partition orientation, wherein the horizontal (HOR) prediction mode is selected in response to the sub-partition orientation being vertical, and wherein the vertical (VER) prediction mode is selected in response to the sub-partition orientation being horizontal.

In some examples, N is equal to two, such that two modes are allowed for the luma component.

In some examples, a first set of two modes are selected in response to a first sub-partition orientation, and a second set of two modes are selected in response to a second sub-partition orientation.

In some examples, the first set of two modes comprises a planar mode and a horizontal (HOR) prediction mode, the first sub-partition orientation comprises horizontal sub-partitioning, the second set of two modes comprises a planar mode and a vertical (VER) prediction mode, and the second sub-partition orientation comprises vertical sub-partitioning.

In some examples, each respective mode of the N modes is signaled using a corresponding binary codeword from a set of predetermined binary codewords.

In some examples, the set of predetermined binary codewords is generated using at least one of a truncated binary (TB) binarization process, a fixed-length binarization process, a truncated Rice (TR) binarization process, a truncated unary binarization process, a k-th order Exp-Golumb binarization process, or a limited EGk binarization process.

According to another embodiment of the present disclosure, a method of video coding comprises generating an intra prediction using only N modes out of M possible intra prediction modes for a chroma component of an intra sub partition (ISP) coded block, wherein M and N are positive integers and N is less than M.

In some examples, N is equal to one, such that only a single mode is allowed for the chroma component.

In some examples, the single mode is direct mode (DM), linear model (LM) mode, horizontal (HOR) prediction mode, or vertical (VER) prediction mode.

In some examples, N is equal to two, such that two modes are allowed for the chroma component.

In some examples, N is equal to four, such that four modes are allowed for the chroma component.

In some examples, each respective mode of the N modes is signaled using a corresponding binary codeword from a set of predetermined binary codewords.

In some examples, the set of predetermined binary codewords is generated using at least one of a truncated binary (TB) binarization process, a fixed-length binarization process, a truncated Rice (TR) binarization process, a truncated unary binarization process, a k-th order Exp-Golumb binarization process, or a limited EGk binarization process.

According to another embodiment of the present disclosure, a method of video coding comprises generating a respective luma intra prediction for each of a plurality of corresponding sub-partitions of an entire intra sub partition (ISP) coded block for a luma component, and for a chroma component, generating a chroma intra prediction for the entire intra sub partition (ISP) coded block.

In some examples, each of the plurality of corresponding sub-partitions has a width less than or equal to 2.

According to another embodiment of the present disclosure, a method of video coding comprises generating a first prediction using an intra sub partition mode; generating a second prediction using an inter prediction mode; and combining the first and second predictions to generate a final prediction by applying a weighted averaging to the first prediction and the second prediction.

In some examples, the second prediction is generated using at least one of a merge mode or an inter mode.

According to an embodiment of the present disclosure, a method of video decoding comprises independently performing an intra prediction for a plurality of corresponding sub-partitions, wherein the intra prediction is performed using a plurality of reference samples for a current coding block.

In some examples, no reconstructed sample from a first sub-partition of the plurality of corresponding sub-partitions is used to perform the intra prediction for any other sub-partition of the plurality of corresponding sub-partitions.

In some examples, each of the plurality of corresponding sub-partitions has a width less than or equal to 2.

In some examples, the plurality of corresponding sub-partitions are a plurality of vertical sub-partitions.

In some examples, the method of video decoding further comprises generating a set of prediction samples for the plurality of vertical sub-partitions using a vertical prediction mode with a mode index larger than 50.

In some examples, the method of video decoding further comprises performing the intra prediction for the plurality of vertical sub-partitions independently and in parallel.

In some examples, the plurality of corresponding sub-partitions includes a last sub-partition, and the method further comprises signaling a coefficients block flag (CBF) value for the last sub-partition.

In some examples, the plurality of corresponding sub-partitions includes a last sub-partition, and the method further comprises inferring a coefficients block flag (CBF) value for the last sub-partition at a decoder.

In some examples, the coefficients block flag (CBF) value is always inferred as one.

In some examples, the coefficients block flag (CBF) value is always inferred as zero.

In some examples, more than one prediction sample for the intra prediction are generated in parallel for the plurality of sub-partitions.

According to another embodiment of the present disclosure, a method of video decoding comprises performing an intra prediction for a plurality of corresponding sub-partitions using only N modes out of M intra prediction modes for a luma component of an intra sub partition (ISP) coded block, wherein M and N are positive integers and N is less than M.

In some examples, each of the plurality of corresponding sub-partitions has a width less than or equal to 2.

In some examples, N is equal to one, such that only a single mode is allowed for the luma component.

In some examples, the single mode is a planar mode.

In some examples, the single mode is a DC mode.

In some examples, the single mode is any one of a horizontal (HOR) prediction mode, a vertical (VER) prediction mode, or a diagonal (DIA) prediction mode.

In some examples, the method of video decoding further comprises selecting the single mode in response to a sub-partition orientation, wherein the horizontal (HOR) prediction mode is selected in response to the sub-partition orientation being horizontal, and wherein the vertical (VER) prediction mode is selected in response to the sub-partition orientation being vertical.

In some examples, the method of video decoding further comprises selecting the single mode in response to a sub-partition orientation, wherein the horizontal (HOR) prediction mode is selected in response to the sub-partition orientation being vertical, and wherein the vertical (VER) prediction mode is selected in response to the sub-partition orientation being horizontal.

In some examples, N is equal to two, such that two modes are allowed for the luma component.

In some examples, a first set of two modes are selected in response to a first sub-partition orientation, and a second set of two modes are selected in response to a second sub-partition orientation.

In some examples, the first set of two modes comprises a planar mode and a horizontal (HOR) prediction mode, the first sub-partition orientation comprises horizontal sub-partitioning, the second set of two modes comprises a planar mode and a vertical (VER) prediction mode, and the second sub-partition orientation comprises vertical sub-partitioning.

In some examples, the method of video decoding further comprises signaling each mode of the N modes using a corresponding binary codeword from a set of predetermined binary codewords.

In some examples, the set of predetermined binary codewords is generated using at least one of a truncated binary (TB) binarization process, a fixed-length binarization process, a truncated Rice (TR) binarization process, a truncated unary binarization process, a k-th order Exp-Golumb binarization process, and a limited EGk binarization process.

According to another embodiment of the present disclosure, a method of video decoding comprises performing an intra prediction using only N modes out of M intra prediction modes for a chroma component of an intra sub partition (ISP) coded block, wherein M and N are positive integers and N is less than M.

In some examples, N is equal to one, such that only a single mode is allowed for the chroma component.

In some examples, the single mode is at least one of direct mode (DM), linear model (LM) mode, horizontal (HOR) prediction mode, and vertical (VER) prediction mode.

In some examples, N is equal to two, such that two modes are allowed for the chroma component.

In some examples, N is equal to four, such that four modes are allowed for the chroma component.

In some examples, the method of video decoding further comprises signaling each mode of the N modes using a corresponding binary codeword from a set of predetermined binary codewords.

In some examples, the set of predetermined binary codewords is generated using at least one of a truncated binary (TB) binarization process, a fixed-length binarization process, a truncated Rice (TR) binarization process, a truncated unary binarization process, a k-th order Exp-Golumb binarization process, and a limited EGk binarization process.

According to another embodiment of the present disclosure, a method of video decoding comprises for a luma component, performing a luma intra prediction for a plurality of corresponding sub-partitions of an entire intra sub partition (ISP) coded block, and for a chroma component, performing a chroma intra prediction for the entire intra sub partition (ISP) coded block.

In some examples, each of the plurality of corresponding sub-partitions has a width less than or equal to 2.

According to another embodiment of the present disclosure, a method of video decoding comprises performing a first prediction using an intra sub partition mode; performing a second prediction using an inter prediction mode; and combining the first and second predictions to generate a final prediction by applying a weighted averaging to the first prediction and the second prediction.

In some examples, the method of video decoding further comprises performing the second prediction using at least one of a merge mode and an inter mode.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

Further, the above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact examples described above and illustrated in the accompanying drawings, and that various modifications and changes can be made without departing from the scope thereof. It is intended that the scope of the invention only be limited by the appended claims.

We claim:

1. A method of video decoding, comprising:
performing an intra prediction for a plurality of sub-partitions of a coding block in a Intra Sub-Partition (ISP) mode in response to determining that the plurality of sub-partitions meet first conditions for the intra prediction,
wherein performing the intra prediction for the plurality of sub-partitions of the coding block comprises:
merging at least two sub-partitions of the plurality of sub-partitions into one prediction region for the intra prediction, and
generating predicted samples for the one prediction region in the intra prediction based on a plurality of reference samples of the coding block adjacent to the one prediction region,
wherein the first conditions comprise that the plurality of sub-partitions are a plurality of vertical sub-partitions and each of the sub-partitions has a width less than or equal to 2.

2. The method of claim 1, wherein no reconstructed sample from one sub-partition of the at least two sub-partitions is used to perform the intra prediction for any other sub-partition of the at least two sub-partitions.

3. The method of claim 1 further comprising:
generating a set of predicted samples for the plurality of vertical sub-partitions using a vertical prediction mode with a mode index larger than 50.

4. The method of claim 1 further comprising performing the intra prediction for samples in the one prediction region independently and in parallel.

5. The method of claim 1, wherein the plurality of sub-partitions includes a last sub-partition, and the method further comprises signaling a coefficients block flag (CBF) value for the last sub-partition.

6. The method of claim 5, wherein the plurality of sub-partitions includes a last sub-partition, and the method further comprises inferring a coefficients block flag (CBF) value for the last sub-partition at a decoder.

7. The method of claim 6, wherein the coefficients block flag (CBF) value is inferred as one or zero.

8. The method of claim 1, wherein multiple prediction samples for the intra prediction are generated in parallel for the plurality of sub-partitions.

9. An apparatus of video decoding, comprising:
one or more processors;
a non-transitory computer-readable memory storing instructions executable by the one or more processors,
wherein the one or more processors are configured to:
perform an intra prediction for a plurality of sub-partitions of a coding block in a Intra Sub-Partition (ISP) mode in response to determining that the plurality of sub-partitions meet first conditions for the intra prediction,
wherein performing the intra prediction for the plurality of sub-partitions of the coding block comprises:
merging at least two sub-partitions of the plurality of sub-partitions into one prediction region for the intra prediction, and
generating predicted samples for the one prediction region in the intra prediction based on a plurality of reference samples of the coding block adjacent to the one prediction region,
wherein the first conditions comprise that the plurality of sub-partitions are a plurality of vertical sub-partitions and each of the sub-partitions has a width less than or equal to 2.

10. The apparatus of claim 9, wherein no reconstructed sample from one sub-partition of the at least two sub-partitions is used to perform the intra prediction for any other sub-partition of the at least two sub-partitions.

11. The apparatus of claim 9, wherein, the one or more processors are further configured to:
generate a set of predicted samples for the plurality of vertical sub-partitions using a vertical prediction mode with a mode index larger than 50.

12. The apparatus of claim 9, wherein, the one or more processors are further configured to: perform the intra prediction for the plurality of vertical sub-partitions independently and in parallel.

13. The apparatus of claim 9, wherein the plurality of sub-partitions includes a last sub-partition, and the method further comprises signaling a coefficients block flag (CBF) value for the last sub-partition.

14. The apparatus of claim 13, wherein the plurality of sub-partitions includes a last sub-partition, and the method further comprises inferring a coefficients block flag (CBF) value for the last sub-partition at a decoder.

15. The apparatus of claim 14, wherein the coefficients block flag (CBF) value is inferred as one or zero.

16. A non-transitory computer-readable storage medium storing a plurality of programs for execution by an apparatus of video decoding having one or more processors, wherein the plurality of programs, when executed by the one or more processors, cause the apparatus of video decoding to perform decoding operations including:
performing an intra prediction for a plurality of sub-partitions of a coding block in a Intra Sub-Partition (ISP) mode in response to determining that the plurality of sub-partitions meet first conditions for the intra prediction,
wherein performing the intra prediction for the plurality of sub-partitions of the coding block comprises:
merging at least two sub-partitions of the plurality of sub-partitions into one prediction region for the intra prediction, and
generating predicted samples for the one prediction region in the intra prediction based on a plurality of reference samples of the coding block adjacent to the one prediction region,
wherein the first conditions comprise that the plurality of sub-partitions are a plurality of vertical sub-partitions and each of the sub-partitions has a width less than or equal to 2.

* * * * *